(12) United States Patent
Gray

(10) Patent No.: US 9,600,720 B1
(45) Date of Patent: Mar. 21, 2017

(54) USING AVAILABLE DATA TO ASSIST IN OBJECT RECOGNITION

(71) Applicant: Amazon Technologies, Inc., Reno, NV (US)

(72) Inventor: Timothy Thomas Gray, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 71 days.

(21) Appl. No.: 14/218,216

(22) Filed: Mar. 18, 2014

(51) Int. Cl.
*G06K 9/00* (2006.01)

(52) U.S. Cl.
CPC .................. *G06K 9/00536* (2013.01)

(58) Field of Classification Search
CPC .... G06F 17/30244–17/3028; G06F 17/30864; G06Q 30/0643
See application file for complete search history.

(56) References Cited

U.S. PATENT DOCUMENTS

| | | | | |
|---|---|---|---|---|
| 6,813,395 | B1* | 11/2004 | Kinjo | G06K 9/4604 382/282 |
| 8,160,400 | B2* | 4/2012 | Snavely | G06F 17/30274 382/100 |
| 8,370,282 | B1* | 2/2013 | Leung | G06F 17/30247 706/20 |
| 8,463,071 | B2* | 6/2013 | Snavely | G06F 17/30274 345/419 |
| 8,838,587 | B1* | 9/2014 | Adams | G06F 17/30 707/722 |
| 9,122,707 | B2* | 9/2015 | Wither | G06F 17/30265 |
| 2002/0045988 | A1* | 4/2002 | Yokota | G01C 21/20 701/484 |
| 2004/0225635 | A1* | 11/2004 | Toyama | G06F 17/30241 |
| 2005/0169499 | A1* | 8/2005 | Rodriguez | G01S 19/14 382/100 |
| 2006/0227992 | A1* | 10/2006 | Rathus | G06F 17/30247 382/100 |
| 2009/0099853 | A1* | 4/2009 | Lemelson | G06Q 50/01 705/319 |
| 2010/0046803 | A1* | 2/2010 | Tomita | G06T 3/4038 382/106 |
| 2010/0260426 | A1* | 10/2010 | Huang | G06F 17/30247 382/218 |
| 2011/0074953 | A1* | 3/2011 | Rauscher | H04N 7/181 348/144 |
| 2011/0082886 | A1* | 4/2011 | Futatsugi | G06F 17/30265 707/780 |

(Continued)

*Primary Examiner* — Aaron W Carter
(74) *Attorney, Agent, or Firm* — Seyfarth Shaw LLP; Ilan N. Barzilay; Christopher A. Baxter

(57) ABSTRACT

Processes such as image matching, computer vision, and object recognition can utilize additional data, such as spatial data, to attempt to improve the accuracy of the results of those processes. For example, a computing device acquiring scene data including a representation of an object can also determine spatial data (e.g., location and orientation data). By determining the spatial data, a set of potential matches can be found which can help to more quickly and accurately identify the object based on one or more objects known to be at a corresponding position. The data acquired by the computing device can also be used to update matching data stored for that location, which can assist with subsequent processing.

18 Claims, 14 Drawing Sheets

(56) References Cited

U.S. PATENT DOCUMENTS

| | | | | |
|---|---|---|---|---|
| 2011/0143779 | A1* | 6/2011 | Rowe | G06Q 30/02 |
| | | | | 455/456.3 |
| 2011/0292076 | A1* | 12/2011 | Wither | G06F 17/30265 |
| | | | | 345/632 |
| 2011/0314049 | A1* | 12/2011 | Poirier | G06F 17/30241 |
| | | | | 707/769 |
| 2012/0001939 | A1* | 1/2012 | Sandberg | G01C 21/3682 |
| | | | | 345/633 |
| 2012/0095922 | A1* | 4/2012 | Wada | G06F 21/6245 |
| | | | | 705/51 |
| 2012/0232937 | A1* | 9/2012 | Calman | G06Q 30/06 |
| | | | | 705/4 |
| 2012/0294520 | A1* | 11/2012 | Mei | G06K 9/00335 |
| | | | | 382/164 |
| 2013/0010103 | A1* | 1/2013 | Ihara | G08G 1/04 |
| | | | | 348/116 |
| 2014/0337176 | A1* | 11/2014 | Ruvini | G06Q 30/0625 |
| | | | | 705/26.62 |
| 2014/0344238 | A1* | 11/2014 | Rathus | G06F 17/30864 |
| | | | | 707/706 |
| 2015/0009035 | A1* | 1/2015 | Rasband | G08B 13/246 |
| | | | | 340/572.3 |
| 2015/0127592 | A1* | 5/2015 | Yan | G06K 9/00 |
| | | | | 706/12 |
| 2015/0254723 | A1* | 9/2015 | Chand | G06Q 30/0269 |
| | | | | 705/14.66 |

\* cited by examiner

USING AVAILABLE DATA TO ASSIST IN OBJECT RECOGNITION

BACKGROUND

As people are increasingly utilizing portable computing devices, such as smart phones and tablets, to perform a variety of tasks, there can be advantages to improving the capabilities provided by these and other such devices. For example, users are increasingly using their portable computers to capture images and video, instead of using conventional digital cameras. Users are able to upload those images for processing to attempt to identify or recognize one or more objects represented in the images. Similar processes can be used for audio, video, and other such data. Using conventional approaches, full images are transmitted to a server for analysis, with each image being scanned individually. Such an approach can provide for an undesirable amount of latency in many situations. Unfortunately, processes for reducing the amount of latency also tend to decrease the accuracy of the results.

BRIEF DESCRIPTION OF THE DRAWINGS

Various embodiments in accordance with the present disclosure will be described with reference to the drawings, in which.

DETAILED DESCRIPTION

Figure 1:
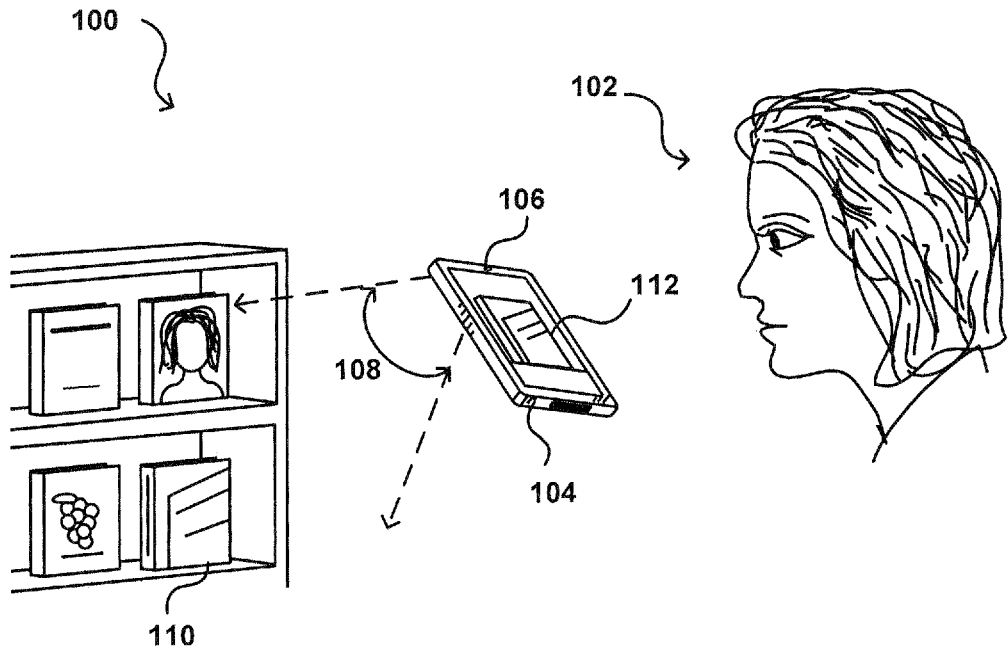
FIG. 1 illustrates an example environment in which aspects of the various embodiments can be that can be utilized.

Systems and methods in accordance with various embodiments of the present disclosure may overcome one or more of the aforementioned and other deficiencies experienced in conventional approaches to acquiring, identifying, and/or displaying content using an electronic device. In particular, various embodiments enable a computing device to analyze information, such as scene data and/or spatial data captured by one or more sensors or components of the computing device, or otherwise obtained for the device, to attempt to identify one or more objects represented in the information. Scene data can include, for example, one or more types of media data as may include images or video data captured by a camera or audio data captured by a microphone of a computing device. For example, scene data might include images captured by one or more cameras in one or more directions with respect to a computing device, as well as audio data captured by at least one microphone of the computing device. This "scene" data thus can be used to determine information about an environment in which the computing device was operating at or near a specific point in time. Spatial data can include position data captured by a global positioning system or other position determining approach, orientation data using an electronic compass or gyroscope, and/or any other appropriate data capable of being acquired by one or more sensors (or other such components) of a computing device. This can include, for example, distance data captured by a proximity sensor or determined by a stereoscopic camera system, among other such options. The identification can compare captured scene and/or spatial data against stored matching data, which can include previously-acquired scene data and/or spatial data, among other types of data, captured by at least one other computing device that may be associated with at least one other user. The represented objects can include tangible and/or intangible objects, such as may include, for example, text strings, bar codes, songs, movies, products, locations, people, weather-related information, and other types of items, events, and/or occurrences.

Various embodiments can utilize spatial data, such as location, orientation, and/or direction data, to attempt to improve a matching, identification, recognition, or computer vision process, for example, by enabling data (e.g., scene data) previously associated with a position to be used to assist the process. In many cases, the matching data (e.g., previously-acquired scene data) will have been acquired by one or more other user devices at, or near, the position of interest, at any appropriate time in the past. In some embodiments, there can be different instances of scene data for a position, with each instance representing an identification of one or more objects at that location at a different point in time. For example, one or more images that were previously acquired and associated with a position can be used to select an initial matching set, thereby reducing latency and enabling a lower confidence threshold to be used than might otherwise be possible when matching against a large, general data set. Similarly, data provided by a user can be associated with a position and used for matching or recognition processes for other users. The ability to correlate additional data with image data, for example, enables other objects previously located at a position to also be identified to a user, for example, among other such options. In at least some embodiments, additional content such as actionable content can be provided to the user upon a successful identification. Actionable content can include links, addresses, scripts, or various other content that enables one or more actions (e.g., purchase, view, or download a version of the object or related content) to be performed that are related to an identified object, Various other applications, processes and uses are presented below with respect to the various embodiments.

FIG. 1 illustrates an example environment 100 in which aspects of the various embodiments can be implemented. In this example, a user 102 is in a store that sells books, and is interested in obtaining information about an object of interest, in this case a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, wearable computers (such as smart watches or glasses), and portable media players, among others. Further, other ways of obtaining image data, as may include acquiring, receiving, capturing, generating, or downloading image data, can be utilized as well in accordance with various embodiments.

In this example, a camera on the device 104 can capture image information including a representation of the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the representation of the book on the screen or drawing a bounding box around the representation, among other such options. In other embodiments, one or more image analysis algorithms can attempt to locate one or more object representations in a scene to be analyzed. In some embodiments, a user can manually cause image information to be analyzed, while in other embodiments the image information can be analyzed automatically, either on the device or by streaming scene data to a remote system or service as discussed later herein.

Figure 2:
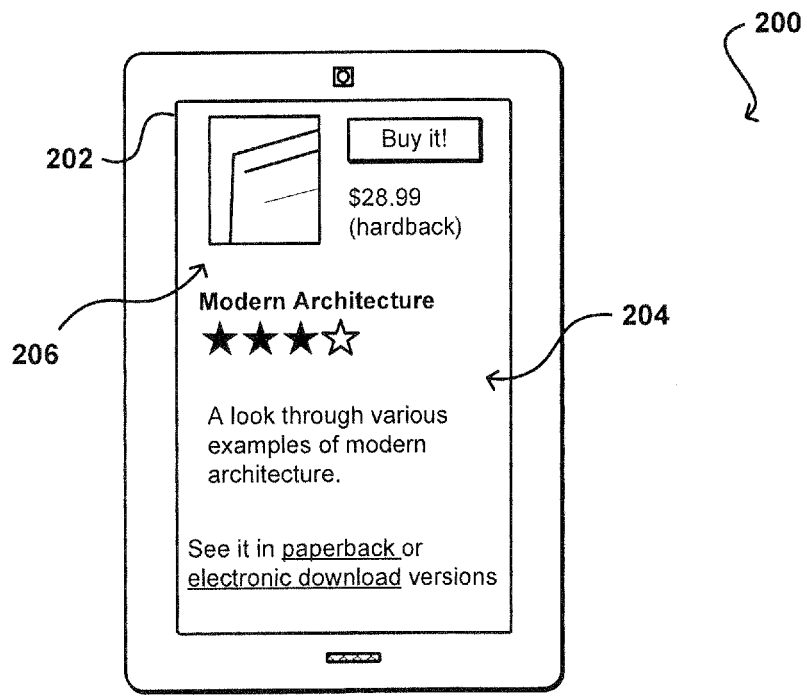
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the scene data using one or more matching or identifying algorithms, or other such approaches. These can include, for example, image recognition algorithms, feature recognition algorithms, facial recognition algorithms, audio pattern recognition algorithms, or any other such approaches or techniques. In at least some embodiments, a set of image features (e.g., representative points identified by an image matching process) is determined for an obtained image and compared against a set of image features against each image of a set of potential matches until a match is found with at least a minimum level of confidence. The displayed information in this example includes the title of the located book, an image of the book (as captured by the user, provided by a publisher, or otherwise obtained), pricing and description information, and review information. Also as shown are options that relate to "actionable" content associated with this item, which in this example can enable a user to purchase the book, as well as options to obtain various other versions or forms of that content, such as a paperback book or digital download. The type of information displayed (or otherwise conveyed) can depend at least in part upon the type of content located or matched. For example, with facial recognition the information might include name, title, and contact information. Various other types of information can be displayed as well within the scope of the various embodiments.

Figure 3A:
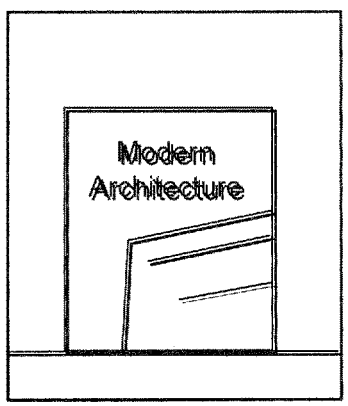
FIGS. 3(a), 3(b), 3(c), and 3(d) illustrate example approaches for identifying an object that can be utilized in accordance with various embodiments.
Figure 3B:
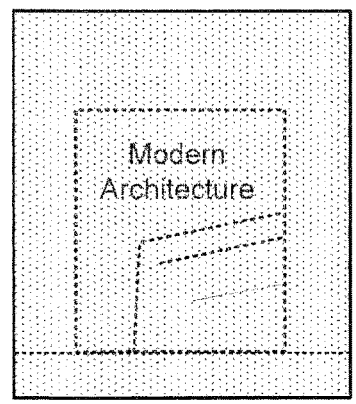
Figure 3C:
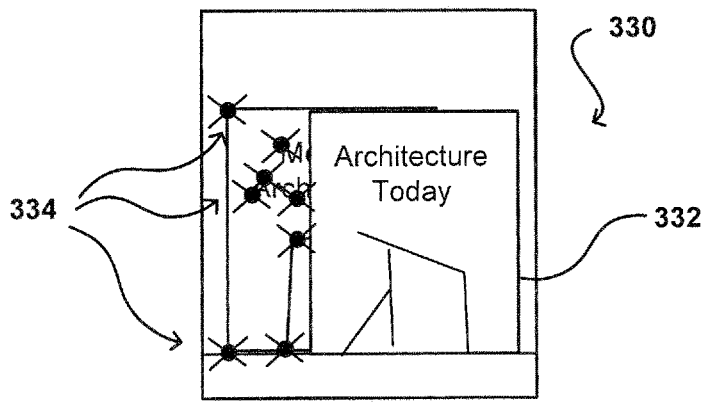
Figure 3D:
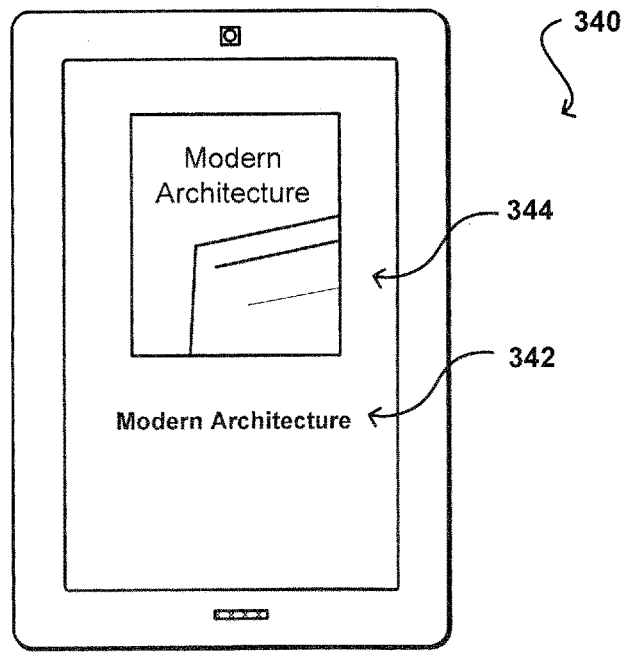

It might be the case, however, that one or more aspects, characteristics, or quality parameters of a captured image may be insufficient to enable accurate image matching and/or object recognition. Quality parameters, as discussed elsewhere herein, can include parameters such as blur level, contrast, brightness, color, and the like. For example, in the example image 300 of FIG. 3(a), the representation of the book is somewhat blurry, as may be due to device motion, improper camera focus, or other such causes. Accordingly, the representation of the object may not be able to be matched with an acceptable level of confidence, for example, as there may be no well-defined feature points in the image. The uncertainty in feature point location can result in a signature, feature vector, or other matching component generated from the image not being able to sufficiently match a signature of a stored image of the book. Similarly, there might be relatively low contrast, insufficient lighting, or other issues that might make it difficult to locate representative features in an image 320, such as is illustrated in FIG. 3(b). There might be other issues that make it difficult to recognize an object represented in an image as well. For example, in the image 330 of FIG. 3(c) a representation of another book 332 is shown to be obscuring a significant portion of the representation of the book of interest. Although a number of feature points 334 or other useful features of the representation may be able to be identified, these may or may not be able to be used to recognize the object with a sufficient level of confidence. If the book is able to be recognized and/or identified from the captured image, information 342 about the book and an image 344 of the book can be displayed on a display of a computing device as illustrated in the example situation 340 of FIG. 3(d), where the image 344 may be a higher quality version that was captured by the camera of the device. The image may be from a publisher, other user, provider, or other such source, which can provide a potentially better quality version than the version captured by the user. A "higher quality" image might have higher resolution, less blur, better contrast or brightness, a better view of the object, etc. In some embodiments, a process can be used to determine whether a better quality image exists, and if not the displayed image can correspond to at least a portion of the image captured by the user. Similarly, any time a user captures an image that includes an object that is identified, the device can potentially display the image captured by the user, another image of the recognized object, or both.

As mentioned, however, various sensor data captured or otherwise acquired by a user may not be sufficient to recognize objects represented in that data. Approaches in accordance with various embodiments can attempt to utilize additional data to assist with the search, computer vision, and/or matching process, for example, which can enable a lower confidence threshold (or other such measure) to be used to determine a match. In other embodiments, the information can be used to select a set of potential matches, and the result with the highest matching score can be considered to be the correct match. Various other approaches can be utilized as well as discussed and suggested herein.

Figure 4A:
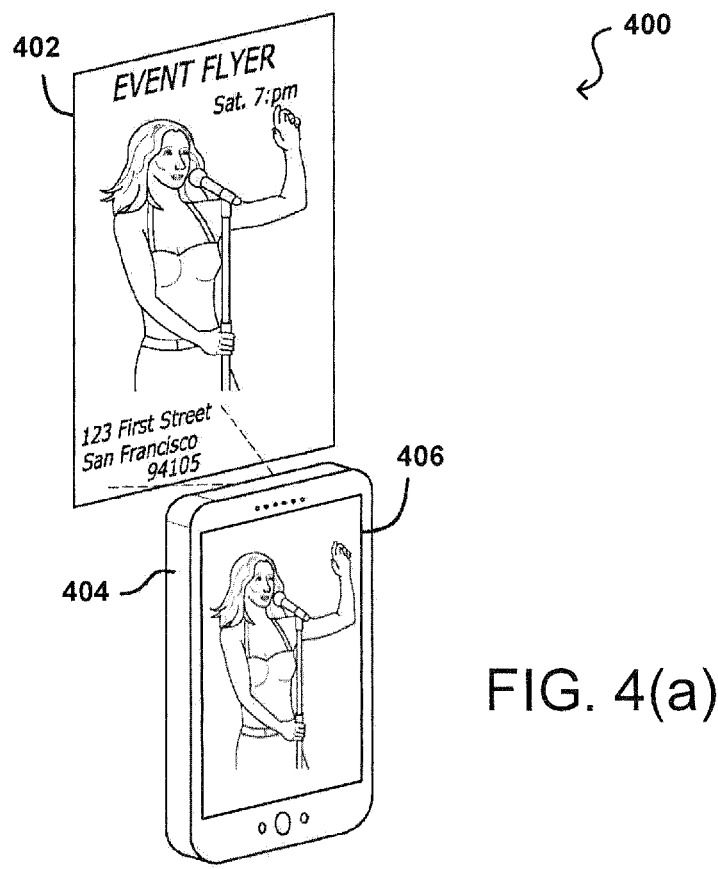
FIGS. 4(a), 4(b), 4(c), and 4(d) illustrate example approaches for using position information to provide information about an object, as well as objects previously located at that position, that can be utilized in accordance with various embodiments.
Figures 4B, 4C, 4D:
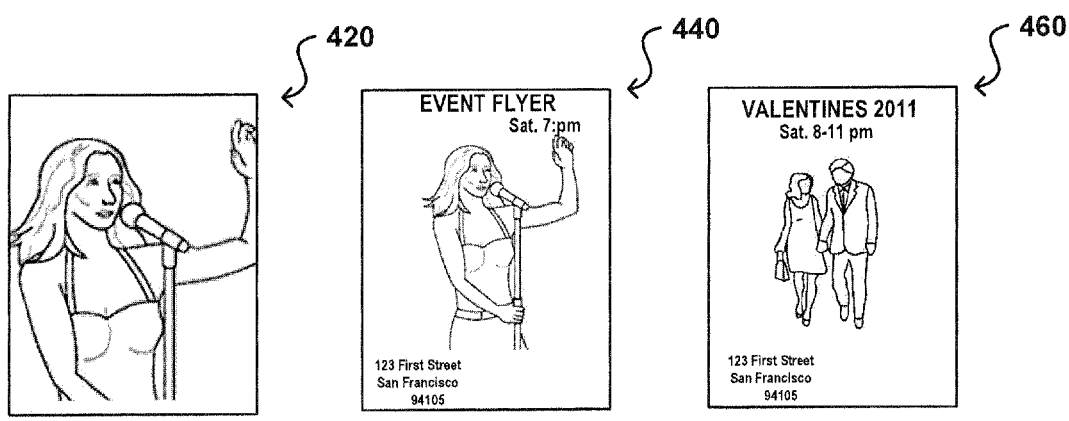

As an example, FIG. 4(a) illustrates a situation 400 wherein a user is utilizing a computing device 404 to capture scene data for a location of the device. In this example, the scene data includes an image 406 of a poster 402. The poster 402 in this example relates to an event, and is located at a particular position such as in a poster case on the outside of a venue. The user might capture an image 420 of at least a portion of the poster, as illustrated in the example of FIG. 4(b). As mentioned, it is possible that the captured image 420 may contain enough data to enable a matching algorithm or other such process to locate the corresponding matching image, such as the image 440 illustrated in FIG. 4(c). In at least some embodiments, the matching image 440 can then be returned and/or displayed to the user.

It might be the case, however, that the image 420 captured by the user is not sufficient to locate an acceptable matching image. In other embodiments the image might be sufficient, but it might be desirable to reduce or limit the number or amount of resources needed to process the image. In still other embodiments, it might be desirable to identify potential matches and then pre-fetch information for those potential matches to help reduce the latency of the matching process. There can be various other ways in which one might want to improve the process over that obtained using conventional approaches.

Accordingly, approaches in accordance with various embodiments can attempt to utilize additional information, such as one or more types of metadata, to attempt to improve one or more aspects of a matching, recognition, or identification process, or to provide a new such process. In at least some embodiments, spatial data such as location and/or orientation data can be obtained using one or more sensors of a computing device, or other components or systems capable of determining that data, which can then be provided as another input to such a process.

For example, a global positioning system (GPS) component or similar component can be used to obtain location data (e.g., geodata) for a computing device at approximately the time at which a camera of the device is used to capture an image. By knowing the approximate location of the device at the time the image was captured, a determination can be made of other objects that are known to exist, or existed at one time, in that approximate location. Such an approach can help to improve the matching process by providing a set of likely matches, for which a lower matching confidence threshold might be used. Such an approach also can help to reduce the latency of the matching process as a smaller set of data is processed, particularly when that data is pre-fetched upon the device being moved to that approximate location.

Referring back to the example situation 400 of FIG. 4(a), the device 404 can potentially determine the location of the device, such that the proximity of the device to the location of the poster 402 can be used to select potential matching images, such as the last image known to be located at that position (as may have been determined from an image captured by another user, provided by an entity associated with the poster position, etc.). If, for example, the user is outside a theater or cinema that has a set of poster positions, the matching set might initially include the set of last known images at each poster position. Because those images are known to be associated with that site, the confidence needed to match one of those images can be lower than for other images, which can allow for more variation in lighting, blur, focus, or other such issues that can potentially lower a matching confidence or other such score. If there are no matches from that set, a more conventional matching process can be performed against a larger dataset or image set, for example. If a match is located, the image or data associated with that position can then be updated to assist with subsequent matching attempts by the same or other users.

Similarly, if the orientation of the device and/or camera can be determined, the set of potential matches can be further limited. For example, if there are five poster locations on the south wall of a theater, and it can be determined that the camera is positioned such that a specific position of the set is near a center region of the field of view of the camera, a quick match can be performed to determine whether the captured image matches the image last updated for that location. In some embodiments, a set of matching data can be sent to the device based at least in part upon the location and/or direction such that a quick match can be performed on the device itself (although in other embodiments the captured image, or data extracted or otherwise associated with the image, can be uploaded to a remote system or service, among other such options). Since a camera will generally have a field of view that can contain representations of multiple objects, the initial matching set can include objects that are at least partially contained within the field of view, or objects that are within a determined proximity, distance, angle, or other such measure from the field of view, or at least from a center line or direction of the camera, among other such options. As will be discussed in more detail later herein, knowing the location and orientation of the device to be able to determine one or more objects in the field of view of the camera can enable information for the object position to be provided on the device even if an image is not actually captured, assuming the data stored for that object position is current and/or correct.

Once the location and orientation (or other spatial data) of the device have been determined, such that one or more object positions can be determined, past images or data associated with those positions can potentially be provided to the user. For example, as illustrated in FIG. 4(c), the user can view an image of the current poster 440, as was determined from the image match and/or position and orientation data, as well as from other potential data as discussed elsewhere herein. In at least some embodiments, the user can also view other images that have been associated with that object position. For example, the user might remember that a movie previously played at a particular cinema, but cannot remember the name of the movie. The user can potentially select an option to view past images for that object position, such as to view an image 460 of a previous poster in that poster case, as illustrated in the example of FIG. 4(d). The user can view past images for other reasons as well, such as to see which bands played at a club, which events were held at a particular location, etc. If the information is available, the user can also potentially see upcoming posters that will be posted at that object position, in order to determine upcoming movies or events, etc. For any or all of these posters, various other types of information can be provided as well as discussed and suggested elsewhere herein. For movies, for example, the data can also include data associated with that movie, such as information about the actors in the movie, locations in the movie, etc.

As mentioned above, for at least some objects, or types of objects, there can be related "actionable" content available as well. Content discussed above, such as name and title information, textual descriptions, and the like, may be considered "non-actionable" content. Actionable content can refer to any information, data, script, link, address, or other such item that enables one or more actions to be performed that are related to the identified object, another object at or near that location, the physical location itself, etc. For example, content such as a phone number or URL might be considered to be actionable content as a computing device can perform at least one specific action or function with respect to each instance that might be of interest to a user. For each instance of actionable content, the interface may provide a user-selectable input, icon, or element associated with the representation of the representation of the associated object. In other embodiments, a user-selectable input or element might be provided for each recognized object, or a specific subset of recognized objects, among other such options. Content such as barcodes and QR codes might be considered either actionable or not actionable in different embodiments. In at least some embodiments, the actionable content can include a link, page address, or product identifier enabling a user to purchase a copy of the identified object. In some embodiments, when an object is identified as an item, such as may include one or more books, games, or toys associated with a movie, music files associated with an artist, etc., that can be purchased or otherwise obtained, active content can be generated or otherwise determined that enables that object to be purchased. Related merchandise, such as merchandise associated with the actors and locations in a movie, can also be provided, as well as other such information, providing the user with quick access to content or items associated with an identified object or location.

Similarly, once an object such as a poster is identified a user can determine other locations where an instance of that object may be located. For example, a user might capture an image of a poster of a movie at a given theater. If the movie is sold out at that theater, the user might want to determine which other theaters or cinemas are playing that movie. By matching the poster image and accessing the position data for occurrences of that image, the user can obtain a list of other positions at which that poster was previously identified. This can also be used to determine other venues where a band is playing, etc.

Figure 5:
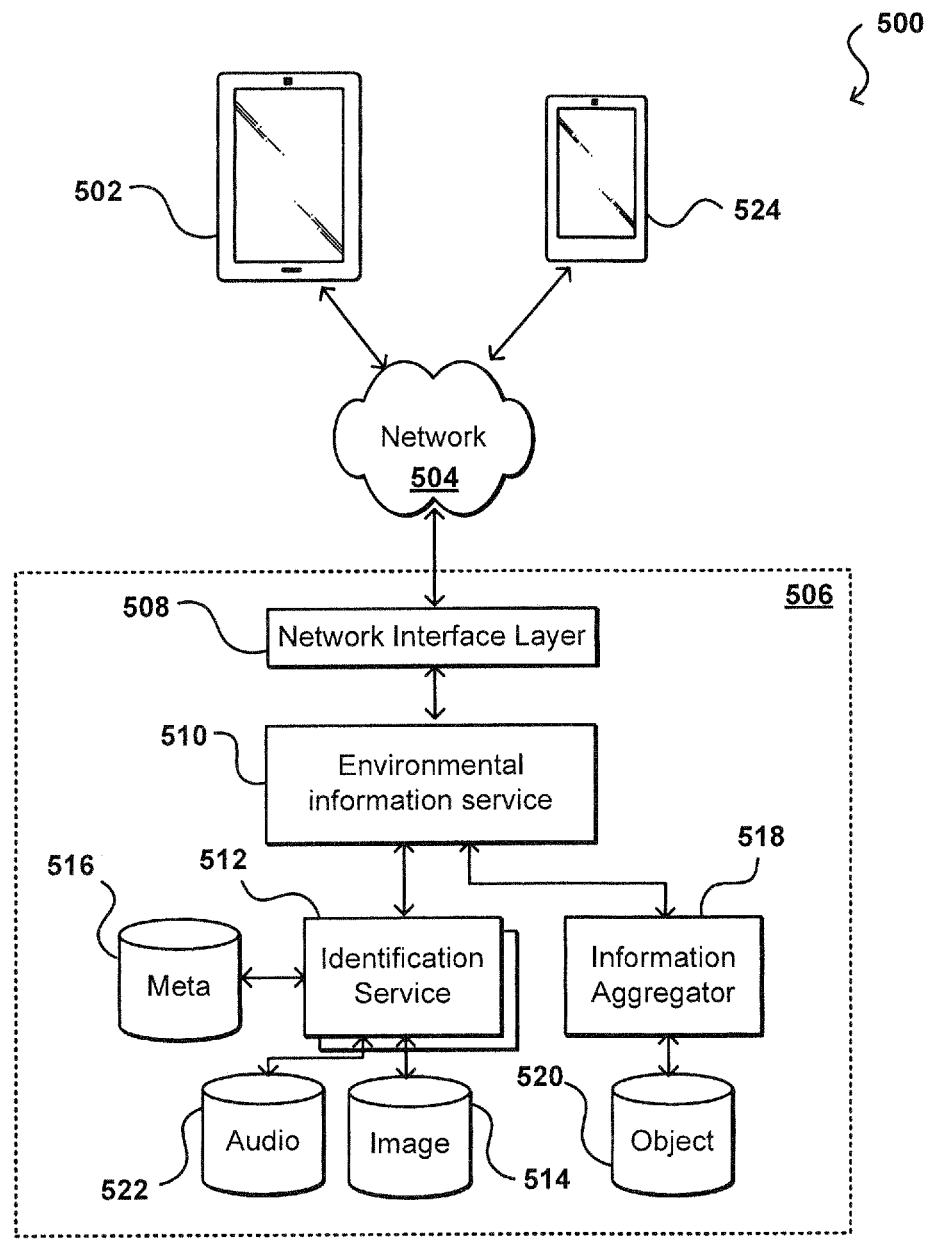
FIG. 5 illustrates an example environment in which aspects of various embodiments can be implemented.

In order to perform a matching, identification, recognition, or other such process, certain embodiments can perform at least a portion of the process on the device itself. At least some embodiments can transfer the captured image, a portion of the captured image, data extracted from the captured image, and/or other such information (such as other scene or spatial data) to a remote system or service, such as by streaming or uploading the data via at least one wired or wireless communication channel to a system or service operable to find one or more potential matches for that data and provide related information (e.g., sensor data) for those potential matches. FIG. 5 illustrates an example environment 500 in which such information can be located and transferred in accordance with various embodiments. In this example, a user is able to acquire one or more types of information using at least one computing device 502. For example, a user can cause a device to capture scene data (e.g., audio, image, and/or video data) around the device, as well as to determine spatial data (e.g., position and/or orientation data). The device 502 can send at least a portion of that data across at least one appropriate network 504 to attempt to obtain information for one or more objects, persons, or occurrences within a detectable vicinity of the device (or otherwise at least partially represented in the scene data). The network 504 can be any appropriate wired and/or wireless network, such as may include the Internet, a local area network (LAN), a cellular network, and the like. The request can be sent to an appropriate content provider 506, as may provide one or more services, systems, or applications for processing such requests. The data can be sent by streaming or otherwise transmitting data as soon as the data is obtained and/or ready for transmission, or can be sent in batches or through periodic communications, among other such options. In some embodiments, the computing device 502 can invoke a service when a sufficient amount of scene data is obtained in order to obtain a set of results. In other embodiments, scene data can be streamed or otherwise transmitted as quickly as possible in order to provide near real-time results to a user of the computing device.

In this example, the request is received to a network interface layer 508 of the content provider 506. The network interface layer can include any appropriate components known or used to receive requests from across a network, such as may include one or more application programming interfaces (APIs) or other such interfaces for receiving such requests. The network interface layer 508 might be owned and operated by the provider, or leveraged by the provider as part of a shared resource or "cloud" offering. The network interface layer can receive and analyze the request, and cause at least a portion of the information in (or associated with) the request to be directed to an appropriate system or service, such as an environmental information service 510 (or object identification service, computer vision process, audio recognition process, etc.) as illustrated in FIG. 5. An environmental information service in this example includes components operable to receive electronic data about an environment, such as the location and/or orientation of a computing device and the region around the device, analyze the data using business or other logic, and return information relating to people, objects, products, places, or things determined to likely be around the computing device at or around the time of the capture or transmission of that electronic information. For example, an environmental information service 510 can receive scene data including one or more images of objects near a device and audio information for a song playing near the device, as well as spatial data (e.g., position and/or orientation information) for the device itself. The environmental information service is capable of recognizing the types of information (e.g., different types of data) and causing each type to be analyzed for purposes of identifying one or more persons, objects, or occurrences associated with the information. In some embodiments, the different types of information might be sent as separate requests, which can be aggregated by the environmental information service 510 for purposes of analysis. For example, spatial data might be sent separate from scene data, such as where spatial data is sent as a device is moved, and scene data is transferred upon user instruction or a specific action. The environmental information can also be programmed to aggregate results for each type of information and transmit those results back to a user in response to the initial request.

The environmental information service 510 in this example can cause information to be sent to at least one identification service 512 or system that is operable to attempt to match information for at least one type of data, type of sensor, etc. For example, one identification service might attempt to recognize objects in captured image data, while another identification service might attempt to recognize songs in captured audio data. The data used for the matching in at least some embodiments can include scene data and/or spatial data that was previously-acquired by one or more other devices corresponding to one or more other users, among other such sources. The same or a separate service might attempt to determine a search location based on spatial data, which can be used to narrow or select an initial set of images against which to match, for example. Various other services, and combinations of services, can be utilized as well within the scope of different embodiments. In at least some embodiments, an identification service 512 will process the received data, such as to extract points of interest or unique features in a captured image, for example, then compare the processed data against data stored in a matching data store 514 or other such location. The data in the matching location data store might be indexed and/or processed to facilitate with matching, as known for such purposes, and may be associated with geo-data or other location information to assist with the search or matching process. For example, the data store might include information for unique features in an image instead of a copy of the image itself, and can include metadata regarding the position, which can increase the speed and lower the processing requirements of the matching.

The environmental information service 510 can receive information from each contacted identification service 512 as to whether one or more matches could be found for at least one type of data, and can receive any appropriate information for a located potential match. The information from each identification service can be analyzed and/or processed by one or more applications of the environmental information service, such as to determine data useful in obtaining information for each of the potential matches to provide to the user. For example, an environmental information service might receive names, titles, object identifiers, bar codes, product identifiers, or any other types of data from the identification service(s), and might process that data to be provided to a service such as an information aggregator service 518 that is capable of locating descriptions or other content related to the located potential matches, such as may be stored as entries in an object data store 520.

In at least some embodiments, an information aggregator service 518 might be associated with an entity that provides an electronic marketplace, or otherwise provides items or content for consumption (e.g., purchase, rent, lease, or download) by various customers. Although products and electronic commerce are presented in this and other examples described herein, it should be understood that these are merely examples and that approaches of the present disclosure can relate to any appropriate types of objects, events, elements, occurrences, or information as discussed and suggested elsewhere herein. In such an instance, the information aggregator service 518 can utilize the aggregated data from the environmental information service 510 to attempt to locate products, in a product data store or other such location, which are offered through the marketplace and that match, or are otherwise related to, the located digital entities. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 502 to obtain information for one or more products, etc. The information aggregator can also utilize the aggregated data to obtain various other types of data as well, such as phone number or yellow page information from a phone information data store or point of interest information from a location data store, etc. Various other types of information can be returned as well within the scope of the various embodiments.

The environmental information service 510 can bundle at least a portion of the information and/or digital entities together as one or more sets of result data to send to the client device 502 as part of one or more messages or responses to the original request. In some embodiments, the information from the identification services might arrive at different times, as different types of information might take longer to analyze, etc. In these cases, the environmental information service might send multiple messages to the client device as the result data becomes available. The digital entities located by the various identification services can be written to a log data store or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

As mentioned, an architecture such as that described with respect to FIG. 5 can be advantageous over conventional identification services at least for the fact that a user can send various types of data captured or otherwise obtained by a device as a collection of scene data, and can ask for information relating to any object, person, occurrence, or other item or element able to be identified from that scene. The scene data can include any appropriate type of data obtained by any sensor or other element of one or more electronic devices. For example, the user might stream information including an amount of video (e.g., five seconds, an amount manually selected by the user, or any other appropriate amount) captured by a video camera, along with a corresponding amount of audio data captured by a microphone of the computing device and/or other information captured by one or more sensors of the same or different types. In some embodiments, audio and video data might be captured by different devices that are able to communicate with each other, or another such arrangement. Spatial data can include various other types of sensor data, such as location data from a global positioning system (GPS) element or triangulation service, motion data from an accelerometer or inertial sensor, and other such information from similar sources. In at least some embodiments, the spatial data can be used to assist with one or more matching algorithms, used to suggest related elements, or other such aspects. In at least some embodiments, the application causing the scene and/or spatial data to be streamed or uploaded can request information pertaining to anything that can be identified from the scene data, including people, products, songs, locations, etc. In this example, the identification services are responsible for identifying the elements in a scene, and the environmental information service is responsible for generating the digital entities or sets of information to be provided to the client device for at least a portion of the identified elements.

It should be understood that, although the identification services are shown to be part of the provider environment 506 in FIG. 5, one or more of these identification services might be operated by third parties that offer these services to the provider. For example, an electronic retailer might offer an application that can be installed on a computing device for identifying music or movies for purchase. When a user transfers an audio clip, for example, the provider could forward this information to a third party who has software that specializes in identifying songs from audio clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the environmental information service to the client device 502.

In at least some embodiments, the environmental information service might return results that the user did not intend to capture. For example, a pack of gum might be on a person's desk and might be identified to the user as having been recognized from the provided image data. In at least some embodiments, a user can have the option of deleting results or otherwise indicating that the user is not interested in that type of data. In other embodiments, an application or service might monitor the type of results that the user is interested in, and use this behavioral data to suggest types of information to be displayed to a user. For example, if a user never uses the service to identify people but only products, then over time the service might learn to weight product results more heavily, specify not to return person identity results, etc. A service might also leverage data for the catalog or provider being used to provide the digital entities. For example, if a user has indicated to an electronic marketplace that the user does not like country music, the service might use this information to avoid sending digital entities relating to country music, in order to conserve bandwidth, storage, and other such aspects. At some point, the environmental information service can hear back from all the contacted identification services and/or information aggregators, and can send an "end identify" or similar call to the client device such that the client knows all identifying information has been provided.

In at least some embodiments, the identification services can provide confidence values for each digital entity. These values can be based on a quality of the match, as known in the art for pattern or feature matching, for example, as well as any other appropriate factors, such as indicated interests of the user, past behavior, purchasing history, and the like. Further, the performance of each identification service might be used to adjust a threshold, rating, weighting, or other aspect of recommendations or matches from each identification service. For example, an image identification service might produce matches that are selected by the user 60% of the time, while an audio identification service might product matches that are selected by the user 85% of the time. Accordingly, matches suggested by the image identification service might be weighted less than matches suggested by the audio identification service in order to adjust or normalize the performance of the identification services. In at least some embodiments, an environmental information service might only select matches of at least a minimum confidence level, or a maximum number of matches selected based on a ranking of confidence levels, to provide to a client device. In other embodiments, the environmental information service might set different selection thresholds for each identification service based on performance or other such factors.

After selecting one or more matches, the environmental information service can send digital entities for elements that match the scene information provided by the client device. In at least some embodiments, the client device might subsequently send another request for related digital entities for one or more elements. The digital entities for which to locate related elements can be based on any of a number of different factors, such as content a user is currently viewing, indicated interests of the user, and capacity on the device, among other such factors. In some embodiments where identification services and/or information aggregators have significantly different response times, the search for related elements might be more predictive, based on what the user might want to see in the near future, in order to start the search process earlier and reduce user wait times. Taking such an approach, the digital entities for the related elements can be sent as they are located until all identification services have provided a response. In other embodiments, the environmental information service might wait until a response has been obtained from all contacted identification services, or a maximum wait time has been reached, to send the digital entities together to the client device. Determinations as to how many messages to send and when to send the messages can be based upon any of a number of factors, such as bandwidth restrictions, storage capacity, current loads or traffic volumes, etc.

Similar considerations can be utilized on the client device when determining an amount of scene information to transmit to an environmental information service. For example, a user might set a limit on the amount of audio or video data that can be transferred in order to attempt to limit bandwidth overage charges. In some embodiments, a user might indicate that the device can only stream audio from one microphone, even though multiple microphones might be capturing audio data concurrently. Similarly, the user might indicate that image or video information only be streamed from one camera, even though multiple cameras might concurrently capture information. In at least some embodiments, the device can attempt to determine an "optimal" capture element for which to stream information. For example, the device might be able to determine a user who is speaking through volume or clarity of the audio, image recognition of a person's mouth moving or a user's gaze direction, or other by using other such approaches. Based at least in part upon these determinations, the device can select a camera or microphone facing that direction, closest to that person, etc., in order to attempt to provide scene information that will most likely produce accurate matches. In some embodiments, a user can manually select which audio or video capture element to use to provide information, can select whether to include position and related information, etc.

As discussed, a process such as an image matching process or object recognition process can be assisted by leveraging other data as well, such as may include spatial data or other data relating to, for example, position and/or orientation of a computing device. For example, another user might have used a different computing device 524 to capture an image of an object at a specific location. Once that object was identified, for example, the image captured by the user (or another image related to that object) can be stored or updated in an image data store 514 or other such location. If the object was a snippet of audio, for example, the audio or information extracted from the audio can be stored in an audio data store 522, among other such options. Further, object position data, such as geo-data, can be obtained from the device 524 (such as by being received with the image) and stored to a metadata data store 516 or other such location. Although separate data stores are discussed, it should be understood that data can be stored to fewer or more data stores, or a single data store, in other implementations.

In at least some embodiments, object position data can be updated over time when that object position data is not determined to be "official" or "authoritative" data. For example, if a provider of data for the object provides actual coordinates for the object, for example, then those coordinates (or other position data relating to the coordinates) can be stored to the data store and used for subsequent matches. If the data comes from user devices, for example, then some or all of the data can be used to attempt to determine the position of the object. For example, if two devices each capture an image of an object, and the devices were located at different locations, then knowing the positions and orientations of each device, as well as the location of the representation of the object in each image, can allow an intersection to be determined that will give the approximate position of the object in three dimensions, which otherwise cannot be obtained reliably from a single image unless the image is a three-dimensional image or other data is available. As additional images of the object are acquired, the location and orientation information can be used to update the object position data until the position converges to a location with a reasonable confidence value or range, etc. Similarly, in order for the location and/or orientation data to be utilized the object should be determined to correspond to the same object in order to update the position data. If the position data matches but the object does not match, in at least some embodiments data for both objects can be stored for that position until at least a second image confirms that a new object is at that location, such that information for the object previously at that location can be deleted, archived, or otherwise handled as appropriate.

Figure 6A:
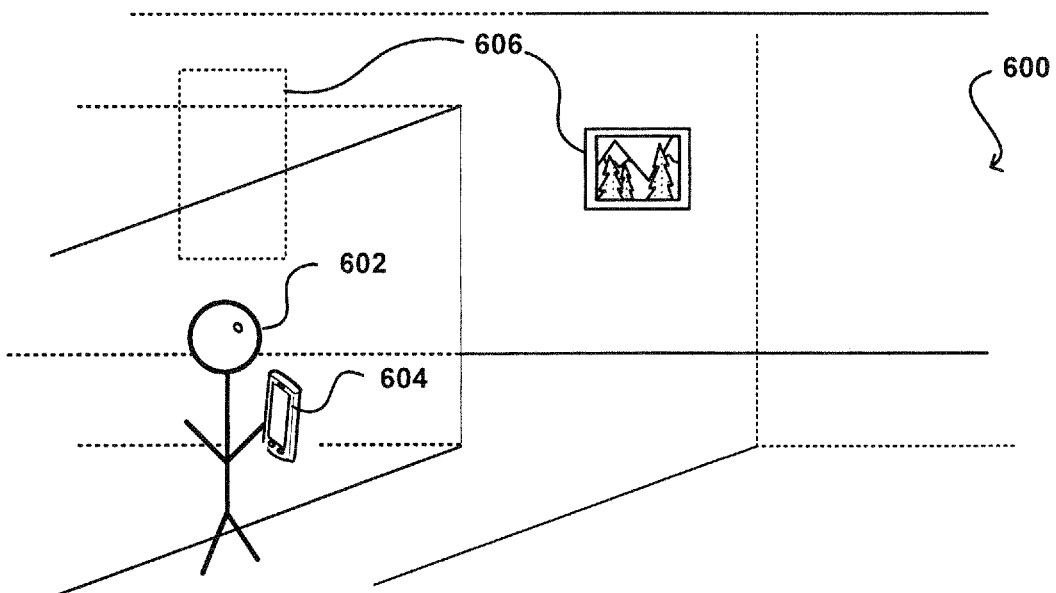
FIGS. 6(a), 6(b), 6(c), 6(d), 6(e), and 6(f) illustrate example approaches for providing content based at least in part upon location and orientation information that can be utilized in accordance with various embodiments.
Figures 6B, 6C:
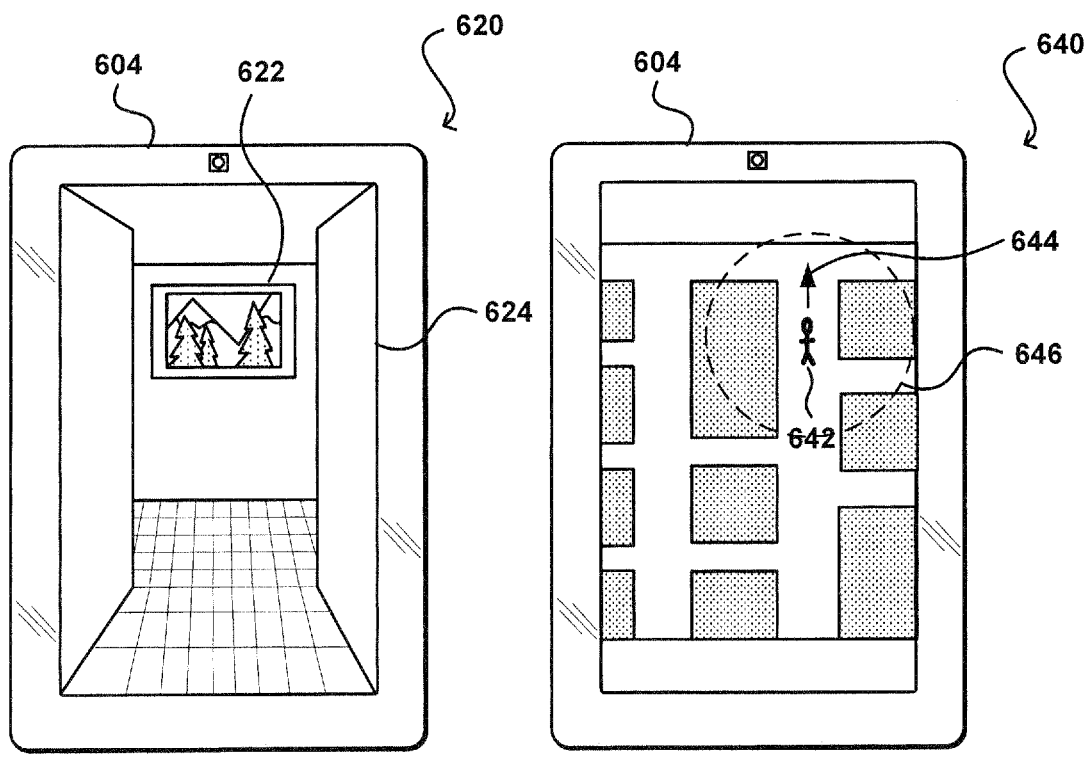

FIGS. 6(a) through 6(f) illustrate another example situation wherein spatial data can assist in processes such as object recognition and computer vision. In this example, a user 602 is utilizing a computing device 604 inside an environment 600 such as a museum, where there are various objects 606 located in specific positions, as illustrated in the example of FIG. 6(a). As illustrated in the example situation 620 of FIG. 6(b), the user can point a camera of the device 604 at an object, such as a painting 622 hanging on a wall, and can view an image 624 of the painting as captured by the camera. As discussed, in at least some embodiments the device can attempt to recognize or identify the painting, such as by uploading a version of the image including a representation of the painting to a system or service configured to return information about the painting, a higher resolution version of the painting, and/or other such data.

Also as discussed herein, the user can potentially also obtain that information using other data, such as the spatial data for the device. For example, consider the example situation 640 illustrated in FIG. 6(c). Although in this figure an image showing the location of the user is displayed on the computing device 604, such as may be used as a map or guide of the museum for the user, it should be understood that position and/or orientation data can be utilized without the display of such information. In this example, the device is able to determine the location of the user in the museum, such as by using a GPS sensor, Wi-Fi triangulation, NFC or RFID based sensors, and the like. The device can also determine an orientation of the device in this example, such as by using an electronic compass, electronic gyroscope, or other such sensor or component. In this example, the data can be used to determine the approximate location of the user in the museum, which can be used in some embodiments to pre-fetch matching data or limit a matching set to objects known to be positioned within a determined region 646 of the position of the user 642, as determined using the device. For example, the device might be able to identify the objects that can be seen from that location in the museum, based on object position data provided by the museum, obtained from other users, or otherwise acquired. In some embodiments, "official" or "authoritative" data provided by an entity associated with that location can be indicated such that it is given priority over all other data captured at that location. In some embodiments, the data can be used to also determine the direction 644 in addition to the location of the user, which in this example can be used to determine that the device is being "pointed" at the object at the end of the hallway in which the user is currently located. This approach can be used to determine that the user is interested in the painting 606 located at the end of the hallway, whether or not the user is actually acquiring image data using the device. If image data is also being captured, a confirmation can be performed to ensure that the data to be provided actually corresponds to the object at that location, in case the object at that object position has changed, there are multiple objects in that general area, or there is something between the device and the painting, and the user is interested in obtaining information for that intermediate object. Various other reasons to confirm the object identity can apply as well.

Figure 6D:
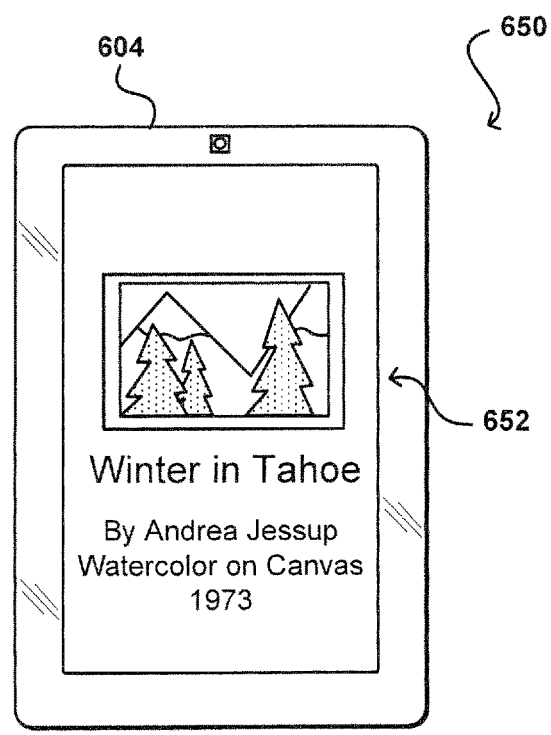

FIG. 6(d) illustrates an example set of result data 652 that can be displayed on the client device in response to identifying the painting. As illustrated, this can include an image of the painting, which can correspond to the image captured by the user, an image provided by the museum (such as might be available over a wireless connection in the museum), or an image from another source, such as another user. Other data can be displayed as well, such as information about the artist, information about the painting, etc. In some embodiments, an audio guide portion can be accessible or auto-played as well, which can provide information about the painting, that portion of the museum, etc.

Figures 6E, 6F:
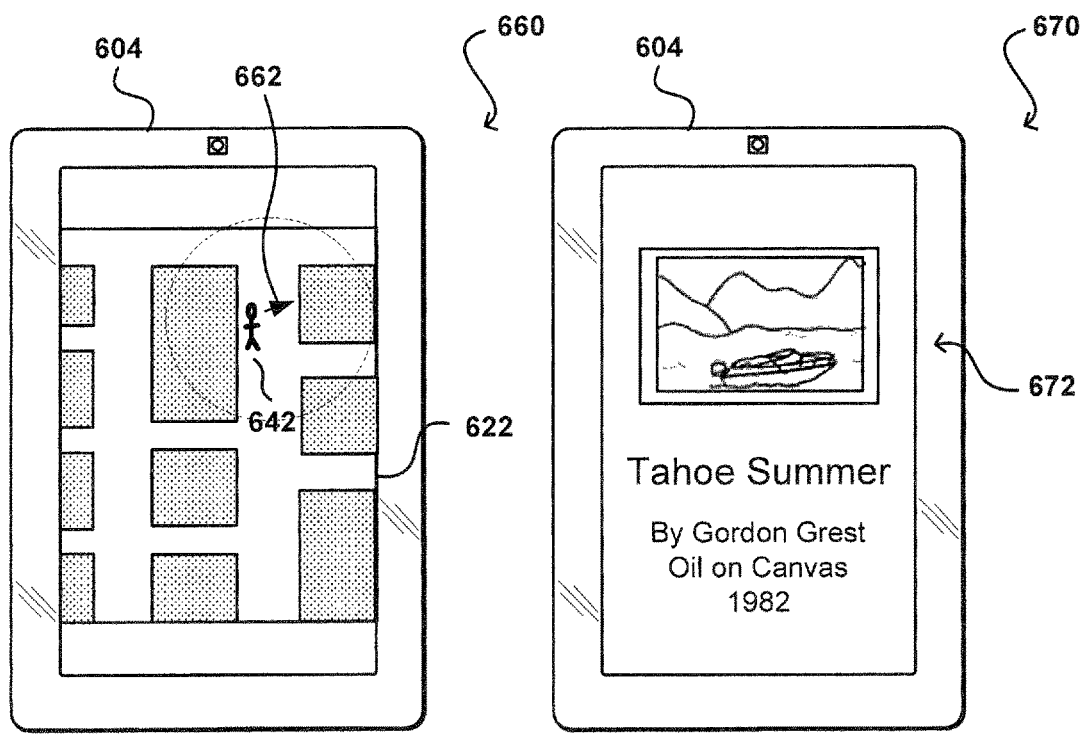

In the example situation 660 of FIG. 6(e), the device is in approximately the same location 642, such that any data pre-fetched or matching set selected can still be based upon the region 622 about that position. If, however, the user turns such that there is a new orientation 662 of the device, a new determination can be made of the painting (or other object) that the user is currently viewing. Accordingly, information 672 for the new object can be determined and displayed on the device 604, as illustrated in the example 670 of FIG. 6(f), based at least in part upon the position and orientation data, captured image data, or a combination thereof. As discussed, other information might be used to determine location as well, such as music playing in the room, a bar code in the gallery or near the painting, etc. Such an approach can enable a user to obtain information about paintings even if there is no cellular signal available in the museum such that image data cannot be uploaded to a remote server or data downloaded to the device, among other such issues. In theory, a user could obtain the data even if lighting was too low or conditions were otherwise unfavorable to capture images of sufficient quality for matching. Similarly, if a museum does not allow images to be captured such an approach can enable the user to obtain information about the objects based at least in part upon location and/or direction data, without having to capture any image or video data.

Figure 7A:
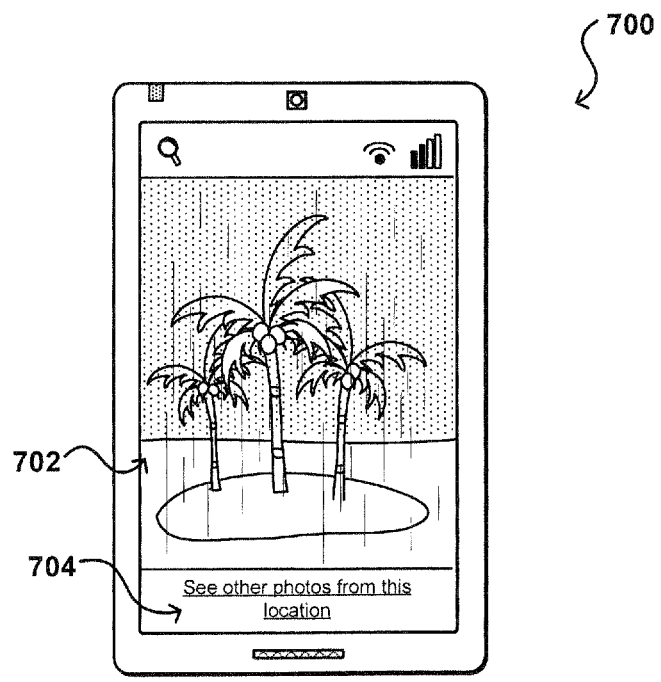
FIGS. 7(a) and 7(b) illustrate an example approach to providing a user with one or more additional images of an object or location that can be utilized in accordance with various embodiments.
Figure 7B:
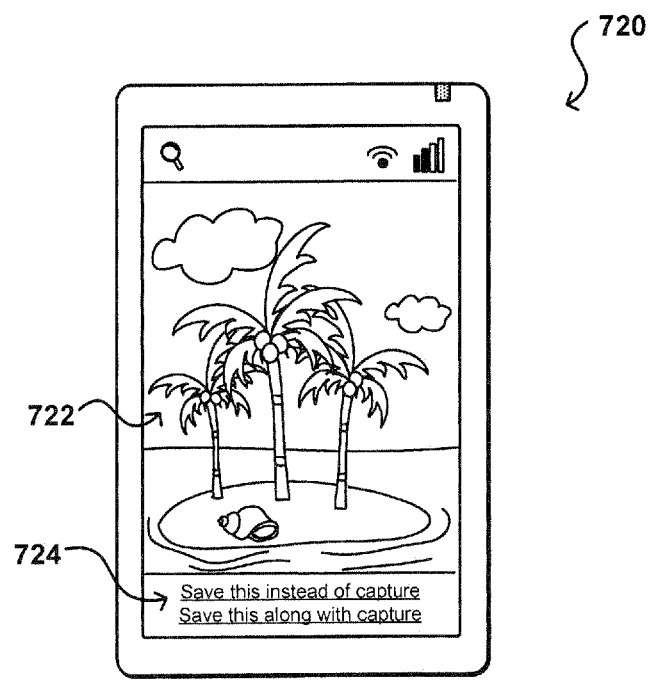

In addition to being able to obtain previously-captured images of other objects at a particular location, being able to determine location and/or orientation of a device can enable different images of the same object(s) to be obtained as well. For example, consider the situation 700 illustrated in FIG. 7(a). In this example, a user has used a computing device to capture an image 702 of a particular location, in this example a small island. Due to the unique formation of trees with respect to the island and other such features, the island can be identified by matching that image against one or more images stored for that location that have associated location metadata, for example. The existence of other images for that location can enable the device to provide one or more options 704 for the user to obtain any or all of those images. For example, in FIG. 7(a) it is cloudy and raining, such that the user might not be happy with the acquired image. If, however, an image 722 exists that shows the location on a sunny day, as in the example situation 720 of FIG. 7(b), the user can utilize one or more options 724 to save the image as an addition image, for comparison, or to save the stored image instead of the acquired image. Other reasons for saving a different image might be utilized as well. For example, a stored image might be higher resolution, have better color or contrast, have less blur, not include various people or other obstructions, etc. Further, the user does not have to make a decision around the time of capture, but can use this as part of an offline process to later replace, add, or update images from a gallery or other such collection. In some embodiments, portions of the stored images can be used to improve a captured image, such as by merging the images to get improved contrast or use sections of a stored image to replace sections of a captured image, such as to allow portions of a captured image to be replaced while keeping specific sections, such as a section including a friend or family member. As applicable, royalties for any images displayed, saved, or otherwise accessed can be paid for by the user individually or as part of a package, supported by advertising, provided as part of a subscription, etc. Various filters may be applied as well in some embodiments in order to comply with copyrights or contracts, or other such limits or restrictions on usage.

Figure 8A:
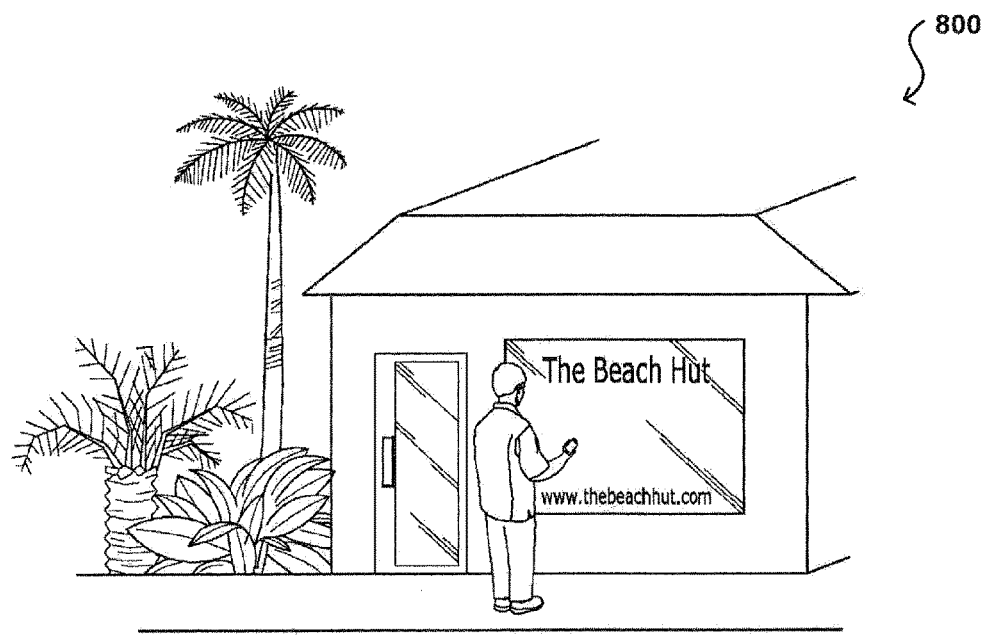
FIGS. 8(a), 8(b), and 8(c) illustrate an example approach to providing a user with one or more additional images of an object or location that can be utilized in accordance with various embodiments.
Figures 8B, 8C:
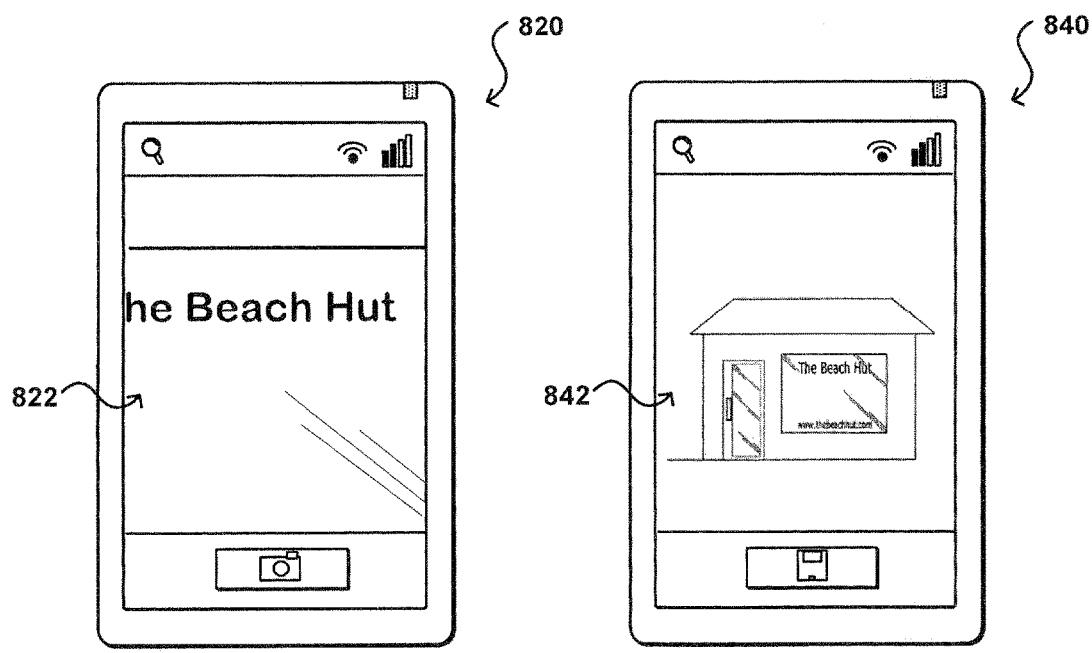

Such an approach can also enable a user to obtain different views, such as to obtain an overhead or perspective shot where the user was only able to obtain a side view. As discussed later herein, images of a location or object also can be stitched together or otherwise utilized to form a multi-view image, three-dimensional model, or other such construct to enable the user to obtain additional views of that object and/or location. In the example situation 800 of FIG. 8(a), a user is capturing an image of a portion of a building. As illustrated in FIG. 8(b), the captured image 822 in this situation 820 shows only a portion of a window of the building. While using conventional image matching processes might not enable the match to be completed with sufficient confidence, as there might be multiple locations or businesses called the Beach Hut, using the location and orientation data from the device can enable the location to be determined, such that the amount of the name visible in the image 822 can be enough to identify the location and the building. A user can then potentially access a full shot of the building 842, as illustrated in the example situation 840 of FIG. 8(c), which the user can then store or otherwise utilize. Such an approach can be beneficial in situations where the user does not have a wide angle lens or the proper position to capture all of a building or monument, for example, but would like to have an image of the entire object. Such an approach can also help a user to obtain a view of an entire building or complex, for example, which enables the user to get a sense of the layout even when the user is only able to see a small portion of the layout. Various other uses of such information can be realized as well within the scope of the various embodiments. As discussed elsewhere herein, other information can be provided that is associated with that location as well. This can include, for example, information about products and services offered at that location, as well as reviews for those products and services, prices from other sources, etc.

Figure 9:
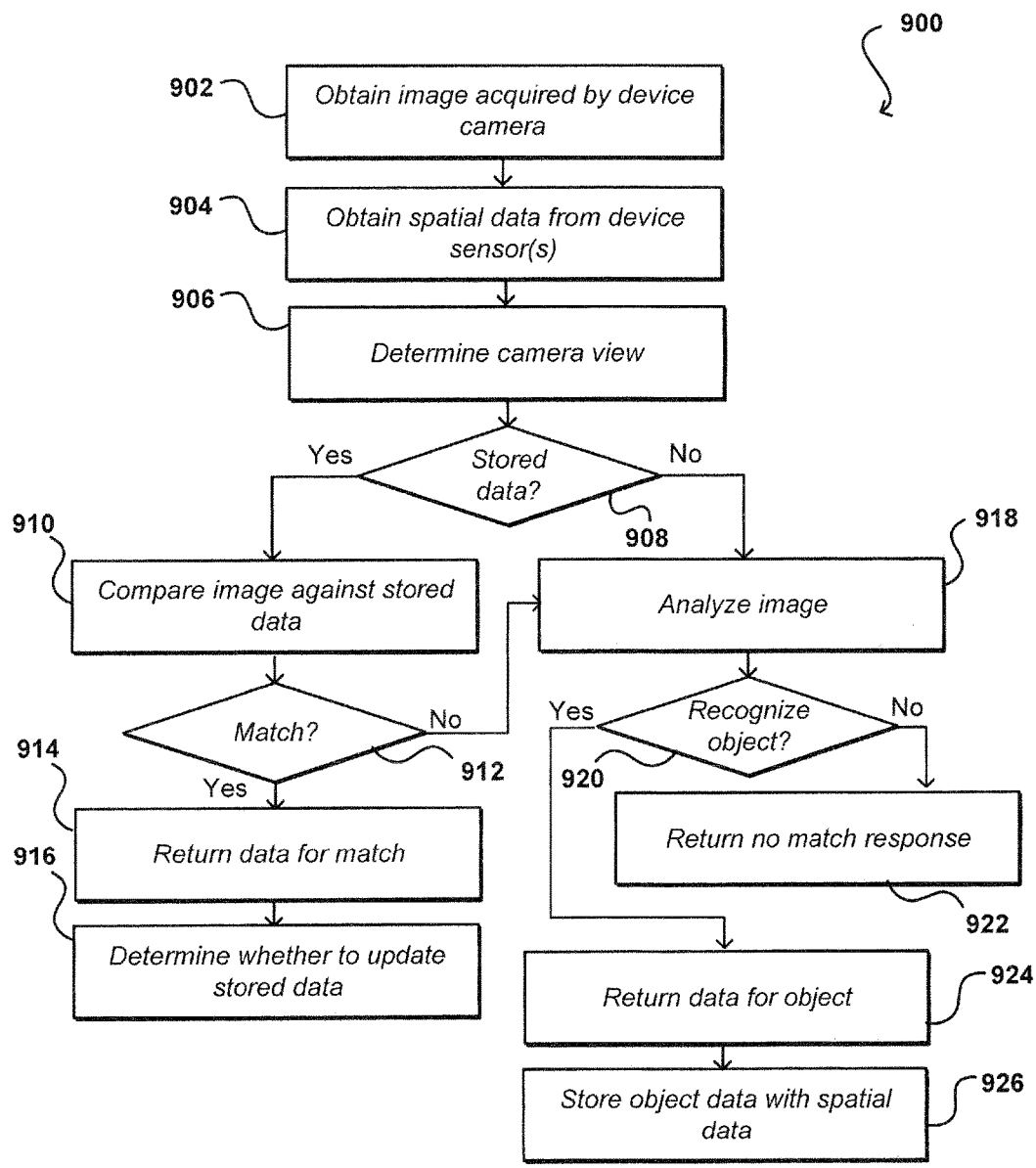
FIG. 9 illustrates an example process for using spatial data (e.g., position and/or orientation data) to assist with object recognition that can be used in accordance with various embodiments.

In accordance with the above discussion, the following illustrate example processes that can be utilized in accordance with various embodiments. For example, FIG. 9 illustrates an example process 900 for using position and orientation data with an image matching and/or object recognition process that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, an image is obtained 902 that was acquired by a camera of a computing device. As discussed, this could be a still image captured in response to user input, a frame of live video, etc. Along with the image, spatial data (e.g., position and orientation data) for the device can be obtained 904 that relates to the approximate time (e.g., within one second) of the acquiring of the image. From the spatial data, a camera view can be determined 906. In some embodiments this can correspond to an object position, such as where a center line of the camera is used to determine the position, while in other embodiments this can correspond to an angular view from the camera up to a distance from the camera, or a distance range that might be visible by the camera, among other such options. As mentioned, the obtaining of spatial data can occur before, during, or shortly after the time of image capture, and in cases where the data is obtained before the image capture at least a portion of the matching data for that position and/or orientation can be pre-fetched in order to enable a quick matching or identification process on the device itself. Pre-fetching in some embodiments utilizes only position data, in order to pre-fetch objects within a given radius or other such measure from that location to enable for quick matching, even in the event that the user does a quick adjustment in device orientation.

From the camera view, a determination can be made 908 as to whether there is previously-acquired data (scene, spatial, metadata, or other) stored for that camera view. This can include, for example, data for one or more object positions located in, near to, or proximate the camera view. If such data exists, the acquired image (or data extracted or generated from the image) can be compared 910 against the stored data to attempt to determine a match or otherwise identify one or more objects represented in the image. As mentioned, since the data is known to be associated with that position a lower confidence threshold can be used than when comparing against a set of images or image data from various other locations. If the acquired image data is determined to match 912 the data stored for that position, then some or all of the data can be returned 914 corresponding to the match. This can include, for example, one or more previously obtained images for that position, description data, or other related content as discussed and suggested elsewhere herein. This can include, for example, actionable content that enables one or more actions to be performed that are related to the identified object. Further, a determination can be made 916 as to whether to update the stored data based at least in part upon the acquired image and/or the spatial data. As discussed, this can include potentially saving the acquired image as a new or additional stored image, updating the object position based on the spatial data, etc.

If the data from the acquired image does not match the stored data, or if there is no stored data for that position that is useful for a matching or recognition process, for example, the image can be analyzed 918 using a conventional recognition, matching, identification, or computer vision process, among other such options. A determination can be made 920 as to whether one or more objects represented in the acquired image are recognized. If not, a message can be returned 922 to the device, or an application executing on the device, indicating that a match was not located. If a match is located or at least one object is otherwise identified or recognized, result data for that at least one object can be returned 924, as again may include image, description, or other related data. Further, information such as the acquired image and any associated data can be stored 926 or otherwise associated with that position. For example, the acquired image or an image of an identified object can be associated with that object position, such that a subsequent user attempting identification can leverage the data already associated with that position as discussed and suggested herein.

Figure 10:
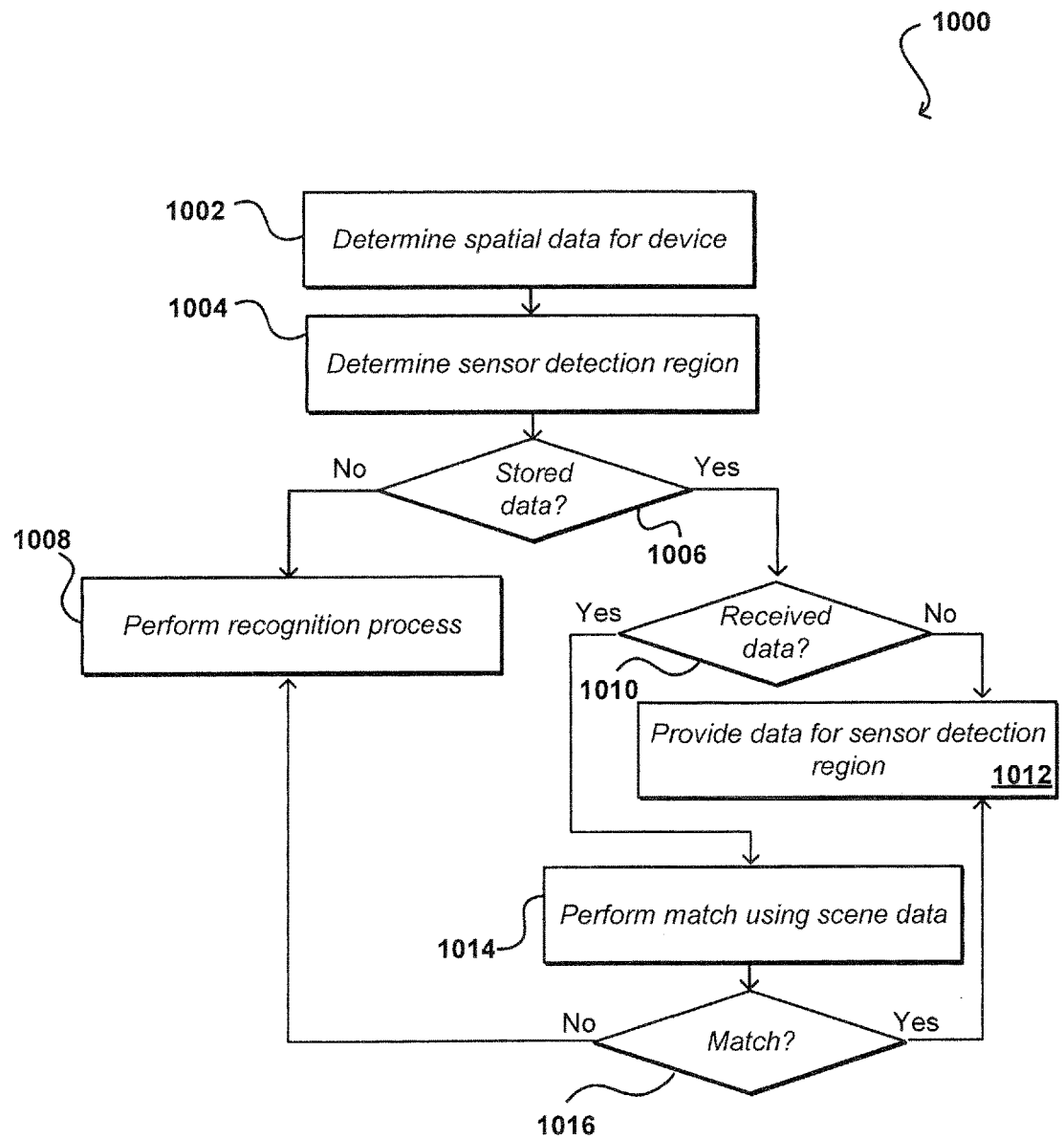
FIG. 10 illustrates an example process for providing different views of an object or location based at least in part upon position that can be used in accordance with various embodiments.

FIG. 10 illustrates another example process 1000 that can be performed in accordance with various embodiments. In this example, spatial data is obtained 1002 for a computing device. As discussed previously, a sensor detection region, object position, camera view, or other such position or range can be determined 1004 based at least in part upon the spatial data. Scene data, such as image, audio, or video data, can be utilized as well, as discussed elsewhere herein. A determination can be made 1006 as to whether there is stored data for that region. If not, a conventional or other recognition, matching, or vision process can be performed 1008 as discussed elsewhere herein.

If stored data does exist for that position, in some embodiments a determination can be made whether scene data is also available 1010 from the device. The scene data can be used to verify that the stored data is still accurate or correct, for example. If sensor data is available, a matching process can be performed 1012 using the scene data and the stored (e.g., previously-acquired) data. If there is determined 1014 to be a match, at least some of the stored data can be provided 1016 as a result of the match, as may including images or data corresponding to an identified object. If there is not a match, a standard recognition or matching process can be utilized as discussed previously.

Processes such as the one described above can also be valuable for other types of matching or identification as well, such as for audio recognition. Information such as location and orientation can assist with audio recognition where the audio is frequently associated with a particular location. Other metadata, such as logo, text, and other signature information can be used as well. There can be digital signatures in the audio, which can be matched against signatures provided by other users or publishers, for example, where the system can attempt to store and utilize the highest quality version, or at least the version determined to be most useful for matching. Each measure of a song can have a unique signature, for example, which can enable a user to access the full song after matching. Similarly, if there is location data and the user identifies a current song, the system can leverage data captured by one or more other users at that location to determine songs that were previously played or recognized, and can enable the user to access that information as well.

Figure 11:
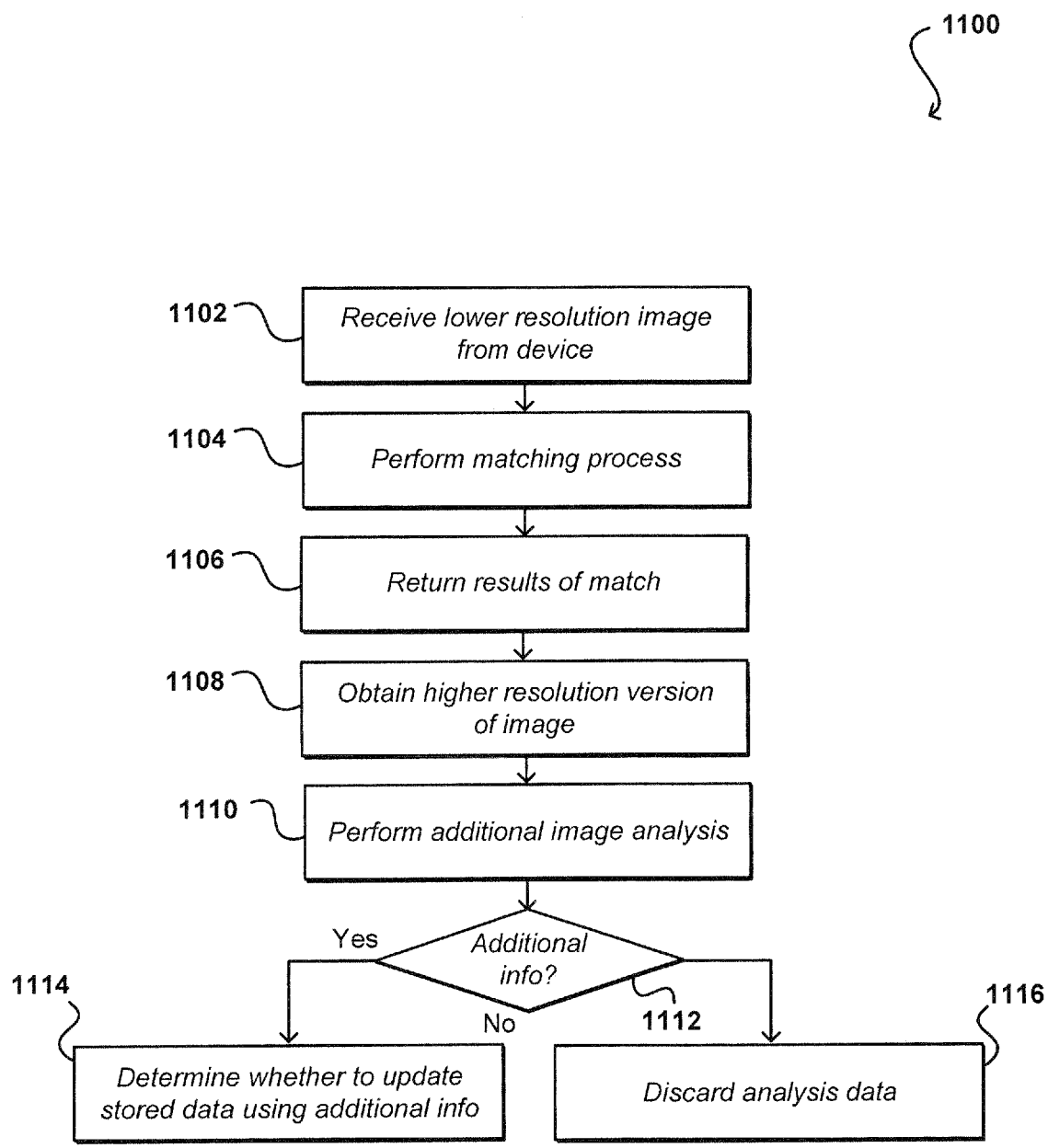
FIG. 11 illustrates an example process for performing a matching process using a low resolution version of an image and performing processing of a higher resolution version of an image that can be used in accordance with various embodiments.

FIG. 11 illustrates another example process 1100 that can be performed in accordance with various embodiments. In this example, a lower resolution image is received 1102 from a computing device, where a camera of the device captured an image of one or more objects and the device generated a lower resolution version to upload to a matching service or other such system or service. In some embodiments, the uploaded data can include matching, vector, or other data generated from the acquired image. An some embodiments, an initial quality processing or pre-processing of the image can be performed before image data is sent for analysis, in case it is desired to conserve resources where it is unlikely that any object representation in the image will be able to be recognized. A matching process (or other computer vision, recognition, or identification process) can be performed 1104 using the lower resolution image, or data extracted from that image. The results of the match can be returned 1106 to the computing device. As discussed, the results can include information about one or more objects identified from the image data, related content for those objects, other images of those objects, etc.

Subsequently, such as may be part of an offline process that transmits data during a period of low activity or Wi-Fi connectivity, for example, a higher resolution version of the acquired image can be received 1108. In at least some embodiments, this can be the actual image that was acquired, although in at least some embodiments some amount of processing may have been performed on the image. A matching process can again be performed 1110, although in some embodiments where a match was identified using the lower resolution version a different image processing algorithm can be used to identify information about the image. This can include, for example, extracting text, logos, or other objects or indicia that may not have been decipherable from the lower resolution image. In some embodiments, conflicts between results can be handled by giving priority to results determined from the higher resolution image. If a match is determined 1112, or if the match was previously determined and additional information was able to be extracted from the higher resolution image, a determination can be made 1114 as to whether or not to update stored information based at least in part upon the higher resolution image or associated data. This can include, for example, storing the higher resolution image for matching purposes or storing data extracted from the higher resolution image. For example, storing text and logo information (i.e., signature information) along with location information can enable a match to be determined independent of any subsequent image matching or other such process. If a match is not obtained, it is determined to not store the image as an additional image, or if the higher resolution image does not provide any additional information, then the analysis data and/or higher resolution image can be discarded 1116 or otherwise processed.

Such a process can be advantageous at least because various processes require a substantial amount of time. For many users, it is desirable to only utilize algorithms and processes that can return results in a very short period of time. Transmitting a lower resolution image reduces transmission and analysis time. At a subsequent time, such as when the full size image is backed up to central storage or a cloud drive, for example, a full set of algorithms or processes can be executed in order to identify text, fine detail, and various other things that may not have been detectable in the corresponding lower resolution images. When the user performs a subsequent match, the information from the higher resolution images can be utilized. Such a process can be particularly useful for situations such as text on an object, where the object can be recognized from the lower resolution image but the text is only decipherable from the higher resolution image. In cases where different users have captured images of an object from different angles, such a process can be used to obtain text that may not have been viewable from the specific angle of the image, which can also help with subsequent image match and/or object identification.

Figure 12:
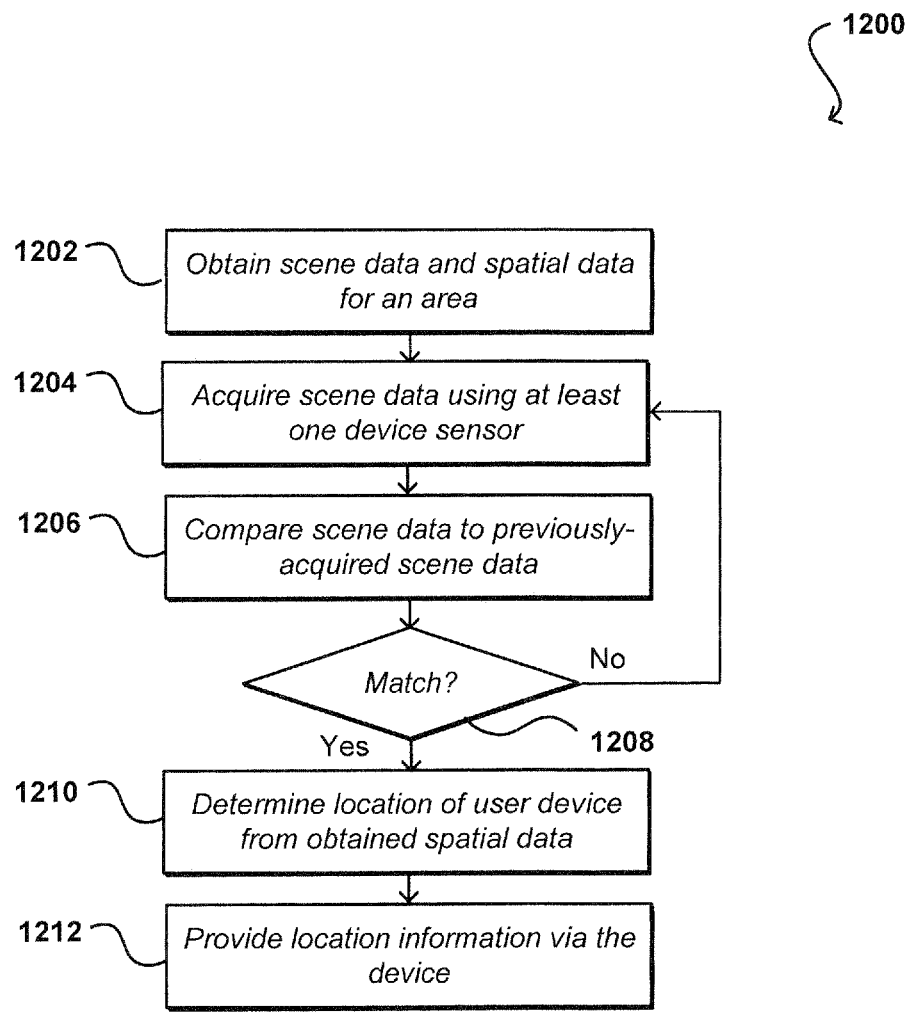
FIG. 12 illustrates an example process for locating a user based at least in part upon acquired scene data (e.g., image or audio data) that can be used in accordance with various embodiments.

FIG. 12 illustrates another example process 1200 that can be utilized in accordance with various embodiments. In this example, scene and spatial data is obtained 1202 for an area, such as an area that a computing device is approaching or a user has indicated is of interest. In some embodiments the data can be obtained while the user is in the area, although advantages of this process can be obtained in some embodiments in situations where the user is not able to connect to a satellite or other network mechanism in order to obtain a GPS signal or transfer image data to a remote service. The area can be any appropriate area, such as a park, museum, mall, geographic region, and the like. As discussed, this can be part of a pre-fetching process in at least some embodiments. At a time after the scene and spatial data is obtained, current scene data can be acquired 1204 using at least one device sensor of the computing device. The scene data can correspond to a still image, frame of video, etc. The scene data can be compared 1206 against the previously obtained scene data, such as by using an image or audio matching application executing on the computing device. A determination is made 1208 as to whether there is a match. If not, the device can continue to acquire scene data and attempt to match those images against the previously-acquired scene data. If a match is located, the spatial data for the matching image data can be utilized to determine 1210 the approximate location of the computing device. This can include a relative location to the position object represented in the image, determined by the location of the representation in the image as well as the size of the representation, which can be used to estimate distance. In some embodiments, the shape of the representation in the image can also be used to determine relative location and/or orientation. Other available information, such as audio data, bar code data, wireless signals, and other indicia also can be used to help with the determination of location of a device in accordance with the various embodiments. Information for the determined location then can be provided 1212 via the device.

Figure 13:
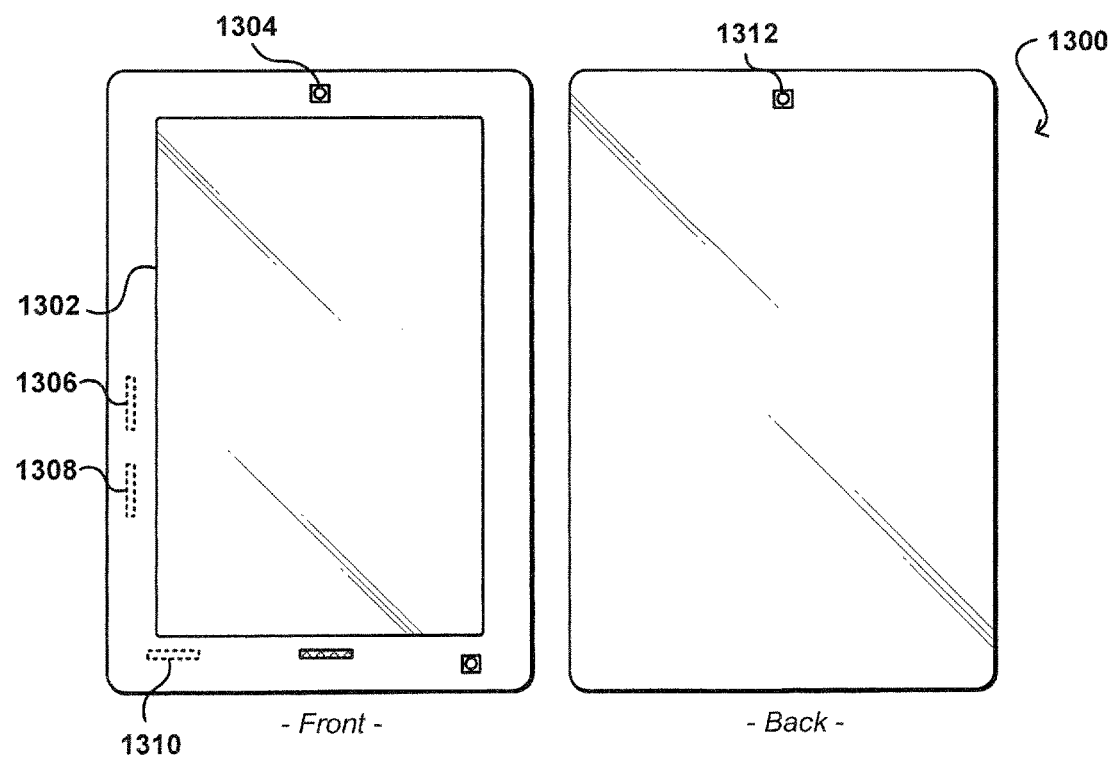
FIG. 13 illustrates front and back views of an example computing device that can be used in accordance with various embodiments.

FIG. 13 illustrates front and back views of an example computing device 1300 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 1300 has a display screen 1302, which under normal operation will display information to a user (or viewer) facing the display screen (e.g., on the same side of the computing device as the display screen). The computing device in this example can include one or more image capture elements, in this example including an image capture element 1304 on the front of the device and an image capture element 1312 on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as may include an electronic compass 1306 and an electronic gyroscope 1308, as well as an accelerometer, inertial sensor, global positioning sensor, proximity sensor, and the like, which can assist with movement and/or orientation determinations. The device also typically will include at least one communication and/or networking element 1310, such as may enable cellular or Wi-Fi connectivity, among others.

Figure 14:
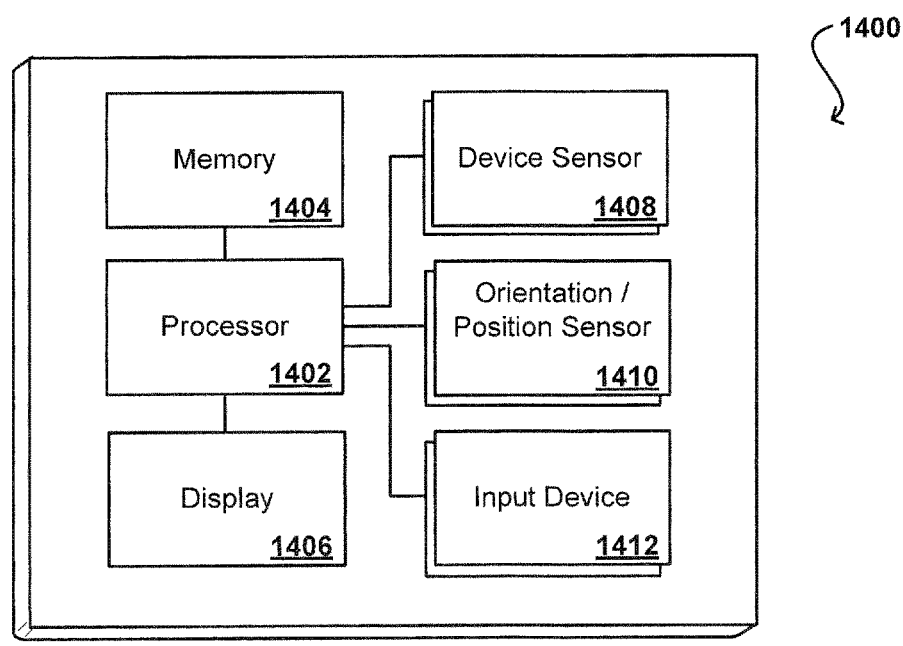
FIG. 14 illustrates example components of a computing device such as that illustrated in FIG. 13.

FIG. 14 illustrates a set of basic components of a computing device 1400 such as the device 1300 described with respect to FIG. 13. In this example, the device includes at least one processor 1402 for executing instructions that can be stored in a memory device or element 1404. As would be apparent to one of ordinary skill in the art, the device can include many types of memory, data storage or computer-readable media, such as a first data storage for program instructions for execution by the at least one processor 1402, the same or separate storage can be used for images or data, a removable memory can be available for sharing information with other devices, and any number of communication approaches can be available for sharing with other devices. The device typically will include at least one type of display element 1406, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one device sensor 1408, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one motion and/or orientation determining element 1410, such as an accelerometer, digital compass, electronic gyroscope, or inertial sensor, which can assist in determining movement or other changes in orientation of the device. The device can include at least one additional input device 1412 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 15:
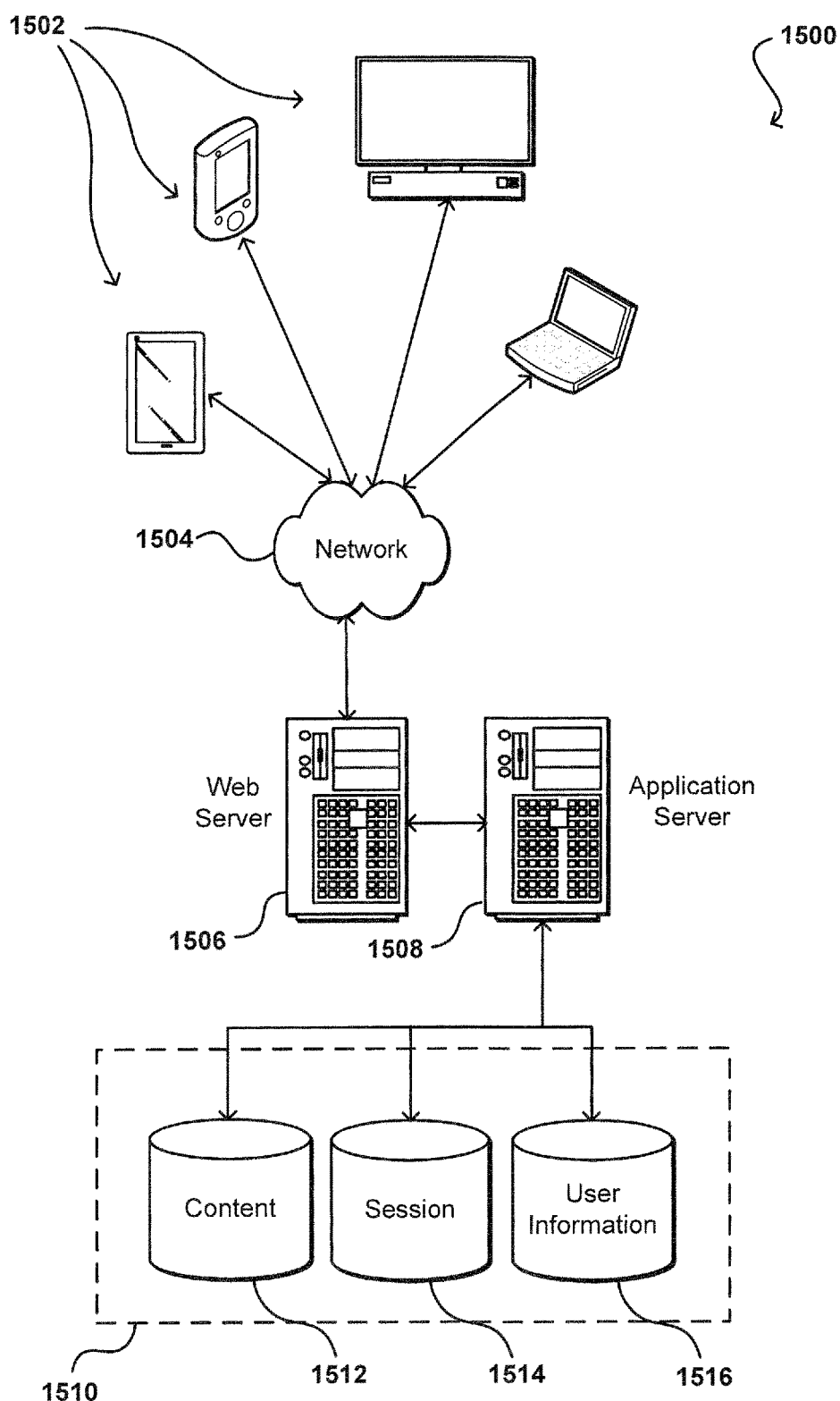
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one processor;
   memory including instructions that, when executed by the at least one processor, cause the computing system to:
   in a first time period:
      obtain first image data acquired using a camera of a first device;
      compare at least a portion of the first image data to second image data previously acquired by at least one second device;
      identify, using a first confidence threshold, a first previously-acquired image of the second image data, the first previously-acquired image matching at least a portion of the first image data;
      determine the first device is approaching a global position;
      obtain third image data associated with the global position, the third image data acquired by the at least one second device;
   in a second time period after the first time period:
      obtain fourth image data acquired using the camera, the fourth image data including a representation of an object;
      compare at least a portion of the fourth image data to the third image data;
      identify, using a second confidence threshold, a second previously-acquired image of the third image data, the second previously-acquired image matching at least a portion of the fourth image data, the second confidence threshold being lower than the first confidence threshold; and provide, to the first device, at least one of the second previously-acquired image or information associated with the second previously-acquired image, wherein the information associated with the second previously-acquired image includes actionable content causing the computing system to provide a purchasing option for an item related to the object.

2. The computer system of claim 1, wherein the instructions when executed further cause the computing system to:
identify at least one additional previously-acquired image of the third image data; and
provide the at least one additional previously-acquired image for display on the first device.

3. The computer system of claim 1, wherein the instructions when executed further cause the computing system to:
compare at least one quality parameter for the fourth image data and the third image data; and
identify the second previously-acquired image based at least in part upon the at least one quality parameter.

4. The computer system of claim 1, wherein the instructions when executed further cause the computing system to:
compare the fourth image data to the third image data using at least one image matching algorithm until a set of image features of the second previously-acquired image is determined to match a set of image features of the fourth image data with at least a minimum level of confidence.

5. A computer-implemented method, comprising:
in a first time period:
obtaining first image data acquired using a camera of a first device;
comparing at least a portion of the first image data to second image data previously-acquired by at least one second device;
identifying, using a first confidence threshold, a first previously-acquired image of the second image data, the first previously-acquired image matching at least a portion of the first image data;
determining that the first device is approaching a global position;
obtaining third image data associated with the global position, the third image data acquired by at least one second device;
in a second time period after the first time period:
obtaining fourth image data using the camera, the fourth image data including a representation of an object;
comparing the fourth image data to the third image data;
identifying, using a second confidence threshold, a second previously-acquired image of the third image data, the second previously-acquired image matching at least a portion of the fourth image data, the second confidence threshold being lower than the first confidence threshold; and
providing actionable content associated with the object, the actionable content enabling at least one action to be performed that is related to the object.

6. The computer-implemented method of claim 5, wherein comparing the fourth image data to the third image data includes at least one of:
performing an object recognition process, or
sending at least a portion of the third image data to the first device for performing the object recognition process.

7. The computer-implemented method of claim 5, wherein determining that the first device is approaching the global position further comprises:
determining one or more locations within an angular view of the camera at a location specified by location data and an orientation specified by orientation data.

8. The computer-implemented method of claim 5, wherein the actionable content includes at least one purchasing option for an item related to the object.

9. The computer-implemented method of claim 5, further comprising:
performing a matching process against media data using the fourth image data; and
adding at least a portion of the fourth image data to the third image data in response to the object being recognized using the media data.

10. The computer-implemented method of claim 5, further comprising:
determining that a matching media file in the third image data has at least one improved quality parameter over a corresponding media file in the fourth image data; and
providing the matching media file for presentation via the first device.

11. The computer-implemented method of claim 10, further comprising:
in a third time period after the second time period:
receiving a higher-resolution version of at least a portion of the fourth image data;
processing at least a portion of the higher-resolution version to extract additional information; and
storing the additional information with the matching media file to assist with future object recognition.

12. A non-transitory computer-readable storage medium storing instructions that, when executed by at least one processor of a computing system, cause the computing system to:
in a first time period:
obtain first image data acquired using a camera of a first device;
compare at least a portion of the first image data to second image data previously-acquired by at least one second device;
identify, using a first confidence threshold, a first previously-acquired image of the second image data, the first previously-acquired image matching at least a portion of the first image data;
determine that the first device is approaching a global position;
obtain third image data associated with the global position, the third image data acquired by at least one second device;
in a second time period after the first time period:
obtain fourth image data acquired using the camera, the fourth image data including a representation of an object;
compare the fourth image data to the third image data;
identify, using a second confidence threshold, a second previously-acquired image of the third image data, the second previously-acquired image matching at least a portion of the fourth image data, the second confidence threshold being lower than the first confidence threshold; and
provide actionable content associated with the object, the actionable content enabling at least one action to be performed that is related to the object.

13. The non-transitory computer-readable storage medium of claim 12, wherein the fourth image data includes representations of a plurality of objects, and wherein the instructions when executed further cause the computing system to:

identify, using the second confidence threshold, a plurality of previously-acquired images of the third image data, the plurality of previously-acquired images including portions that match the plurality of objects.

14. The non-transitory computer-readable storage medium of claim 13, wherein the instructions when executed further cause the computing system to:

provide actionable content associated with each of the plurality of objects.

15. The non-transitory computer-readable storage medium of claim 12, wherein the instructions when executed further cause the computing system to:

store at least a portion of the fourth image data as representing the object as a current object at the global position.

16. The non-transitory computer-readable storage medium of claim 12, wherein the instructions when executed further cause the computing system to:

obtain at least a portion of the third image data from an authority associated with the global position, the at least a portion of the third image data given priority over other image data associated with the global position.

17. The non-transitory computer-readable storage medium of claim 12, wherein the instructions when executed further cause the computing system to:

analyze the actionable content to determine the at least one action enabled to be performed; and
  cause at least one user-selectable element to be displayed on the first device, selection of the at least one user-selectable element causing a respective action of the at least one action to be performed via the first device.

18. The computer-implemented method of claim 5, further comprising:

determining the global position by determining an area having a radial distance within a threshold distance from the first device.

* * * * *